US012432378B2

(12) United States Patent
Zhao et al.

(10) Patent No.: US 12,432,378 B2
(45) Date of Patent: Sep. 30, 2025

(54) ON MOTION COMPENSATED PICTURE BOUNDARY PADDING

(71) Applicant: Tencent America LLC, Palo Alto, CA (US)

(72) Inventors: Liang Zhao, Sunnyvale, CA (US); Xin Zhao, Santa Clara, CA (US); Guichun Li, San Jose, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 163 days.

(21) Appl. No.: 18/135,398

(22) Filed: Apr. 17, 2023

(65) Prior Publication Data

US 2023/0336773 A1 Oct. 19, 2023

Related U.S. Application Data

(60) Provisional application No. 63/452,651, filed on Mar. 16, 2023, provisional application No. 63/331,941, filed on Apr. 18, 2022.

(51) Int. Cl.
*H04N 19/00* (2014.01)
*H04N 19/105* (2014.01)
(Continued)

(52) U.S. Cl.
CPC ......... *H04N 19/563* (2014.11); *H04N 19/105* (2014.11); *H04N 19/132* (2014.11);
(Continued)

(58) Field of Classification Search
CPC .. H04N 19/563; H04N 19/105; H04N 19/132; H04N 19/139; H04N 19/167;
(Continued)

(56) References Cited

U.S. PATENT DOCUMENTS

2012/0307902 A1\* 12/2012 Sugio ..................... H04N 19/52
375/E7.263
2019/0082193 A1\* 3/2019 Sun ........................ H04N 19/82
(Continued)

OTHER PUBLICATIONS

International Search Report and Written Opinion issued Aug. 14, 2023 in Application No. PCT/US2023/065894 (29 pages).
High Efficiency Video Coding, Rec. ITU-T H.265 v4 Dec. 2016, pp. 1-664.
ITU-T and ISO/IEC, "Versatile Video Coding", ITU-T Rec. H.266 and ISO/IEC 23090-3, 2020, pp. 1-516.
(Continued)

*Primary Examiner* — Zhihan Zhou
(74) *Attorney, Agent, or Firm* — ArentFox Schiff LLP

(57) ABSTRACT

Aspects of the disclosure provide methods and apparatuses for video encoding/decoding. In some examples, an apparatus for video decoding includes receiving circuitry and processing circuitry. The processing circuitry receives a bitstream carrying a plurality of pictures, and determines at least a motion compensation padding (MCP) block that is located in an MCP area outside of a picture and next to a picture boundary of the picture. The processing circuitry derives, according to a plurality of candidates with positions located at the picture boundary within the picture, a motion vector of the MCP block for motion compensated boundary padding, and reconstructs at least a sample in the MCP block according to the derived motion vector for the motion compensated boundary padding.

20 Claims, 27 Drawing Sheets

(51) Int. Cl.
*H04N 19/132* (2014.01)
*H04N 19/139* (2014.01)
*H04N 19/167* (2014.01)
*H04N 19/172* (2014.01)
*H04N 19/176* (2014.01)
*H04N 19/184* (2014.01)
*H04N 19/563* (2014.01)
*H04N 19/80* (2014.01)

(52) U.S. Cl.
CPC ......... *H04N 19/139* (2014.11); *H04N 19/167* (2014.11); *H04N 19/172* (2014.11); *H04N 19/176* (2014.11); *H04N 19/184* (2014.11); *H04N 19/80* (2014.11)

(58) Field of Classification Search
CPC .. H04N 19/172; H04N 19/176; H04N 19/184; H04N 19/80
See application file for complete search history.

(56) References Cited

U.S. PATENT DOCUMENTS

| | | | |
|---|---|---|---|
| 2019/0387251 A1* | 12/2019 | Lin | H04N 19/105 |
| 2021/0321111 A1* | 10/2021 | Tamse | H04N 19/137 |
| 2022/0086433 A1* | 3/2022 | Zhang | H04N 19/137 |
| 2022/0103827 A1* | 3/2022 | Liu | H04N 19/159 |
| 2023/0328257 A1* | 10/2023 | Zhang | H04N 19/182 |
| 2023/0396777 A1* | 12/2023 | Deng | H04N 19/513 |

OTHER PUBLICATIONS

J. Chen, et. al., "Algorithm description for Versatile Video Coding and Test Model 10 (VTM 10)", JVET-S2002, ITU-T SG 16 WP 3 and ISO/IEC JTC 1/SC 29/WG 11, Jul. 2020, pp. 1-97.

M. Coban, et al., "Algorithm description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

* cited by examiner

| amvr_flag | amvr_precision_idx | AmvrShift | | |
|---|---|---|---|---|
| | | inter_affine_flag[ x0 ][ y0 ] == 1 | CuPredMode[ chType ][ x0 ][ y0 ] == MODE_IBC | inter_affine_flag[ x0 ][ y0 ] == 0 && CuPredMode[ chType ][ x0 ][ y0 ] != MODE_IBC |
| 0 | - | 2 (1/4 luma sample) | - | 2 (1/4 luma sample) |
| 1 | 0 | 0 (1/16 luma sample) | 4 (1 luma sample) | 3 (1/2 luma sample) |
| 1 | 1 | 4 (1 luma sample) | 6 (4 luma samples) | 4 (1 luma sample) |
| 1 | 2 | - | - | 6 (4 luma samples) |

*FIG. 21*

If inter_affine_flag[ x0 ][ y0 ] is equal to 0, the variables MvdL0[ x0 ][ y0 ][ 0 ], MvdL0[ x0 ][ y0 ][ 1 ], MvdL1[ x0 ][ y0 ][ 0 ], MvdL1[ x0 ][ y0 ][ 1 ] are modified as follows:

MvdL0[ x0 ][ y0 ][ 0 ] = MvdL0[ x0 ][ y0 ][ 0 ] << AmvrShift
MvdL0[ x0 ][ y0 ][ 1 ] = MvdL0[ x0 ][ y0 ][ 1 ] << AmvrShift
MvdL1[ x0 ][ y0 ][ 0 ] = MvdL1[ x0 ][ y0 ][ 0 ] << AmvrShift
MvdL1[ x0 ][ y0 ][ 1 ] = MvdL1[ x0 ][ y0 ][ 1 ] << AmvrShift Otherwise (inter_affine_flag[ x0 ][ y0 ] is equal to 1), the variables MvdCpL0[ x0 ][ y0 ][ 0 ][ 0 ], MvdCpL0[ x0 ][ y0 ][ 0 ][ 1 ], MvdCpL0[ x0 ][ y0 ][ 1 ][ 0 ], MvdCpL0[ x0 ][ y0 ][ 1 ][ 1 ], MvdCpL0[ x0 ][ y0 ][ 2 ][ 0 ] and MvdCpL0[ x0 ][ y0 ][ 2 ][ 1 ] are modified as follows:

MvdCpL0[ x0 ][ y0 ][ 0 ][ 0 ] = MvdCpL0[ x0 ][ y0 ][ 0 ][ 0 ] << AmvrShift
MvdCpL1[ x0 ][ y0 ][ 0 ][ 1 ] = MvdCpL1[ x0 ][ y0 ][ 0 ][ 1 ] << AmvrShift
MvdCpL0[ x0 ][ y0 ][ 1 ][ 0 ] = MvdCpL0[ x0 ][ y0 ][ 1 ][ 0 ] << AmvrShift
MvdCpL1[ x0 ][ y0 ][ 1 ][ 1 ] = MvdCpL1[ x0 ][ y0 ][ 1 ][ 1 ] << AmvrShift
MvdCpL0[ x0 ][ y0 ][ 2 ][ 0 ] = MvdCpL0[ x0 ][ y0 ][ 2 ][ 0 ] << AmvrShift
MvdCpL1[ x0 ][ y0 ][ 2 ][ 1 ] = MvdCpL1[ x0 ][ y0 ][ 2 ][ 1 ] << AmvrShift

FIG. 22

ON MOTION COMPENSATED PICTURE BOUNDARY PADDING

INCORPORATION BY REFERENCE

The present disclosure claims the benefit of priority to U.S. Provisional Application No. 63/331,941, "On motion compensated picture boundary padding" filed on Apr. 18, 2022, and U.S. Provisional Application No. 63/452,651, "On Motion Compensated Picture Boundary Padding" filed on Mar. 16, 2023. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives a bitstream carrying a plurality of pictures, and determines at least a motion compensation padding (MCP) block that is located in an MCP area outside of a picture and next to a picture boundary of the picture. The processing circuitry derives, according to a plurality of candidates with positions located at the picture boundary within the picture, a motion vector of the MCP block for motion compensated boundary padding, and reconstructs at least a sample in the MCP block according to the derived motion vector for the motion compensated boundary padding.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 21 shows a table to determine the number of shifting bits in some examples.

FIG. 22 shows a portion of video coding standard in some examples.

DETAILED DESCRIPTION OF EMBODIMENTS

Figure 1:
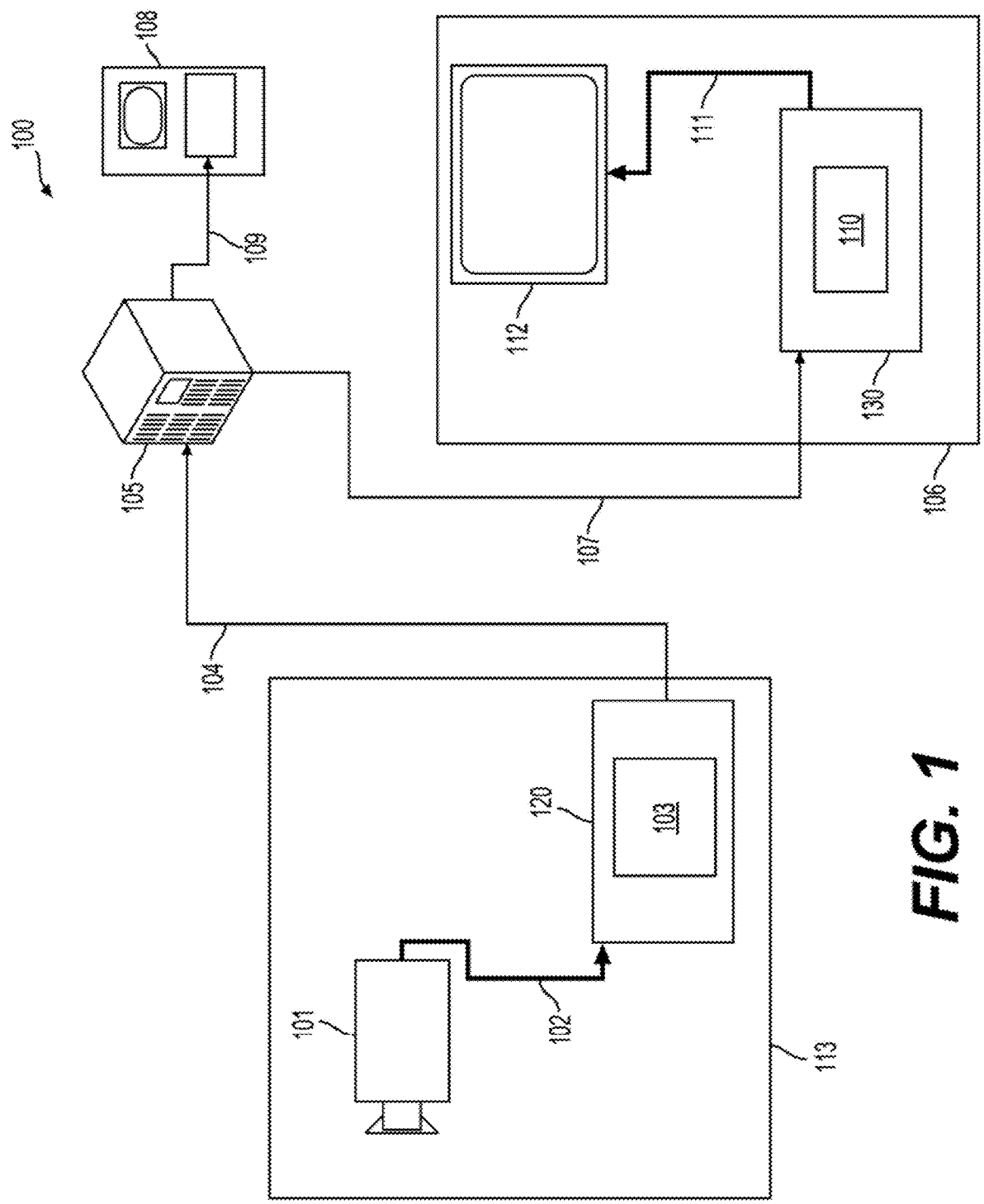
FIG. 1 is a schematic illustration of an exemplary block diagram of a communication system.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
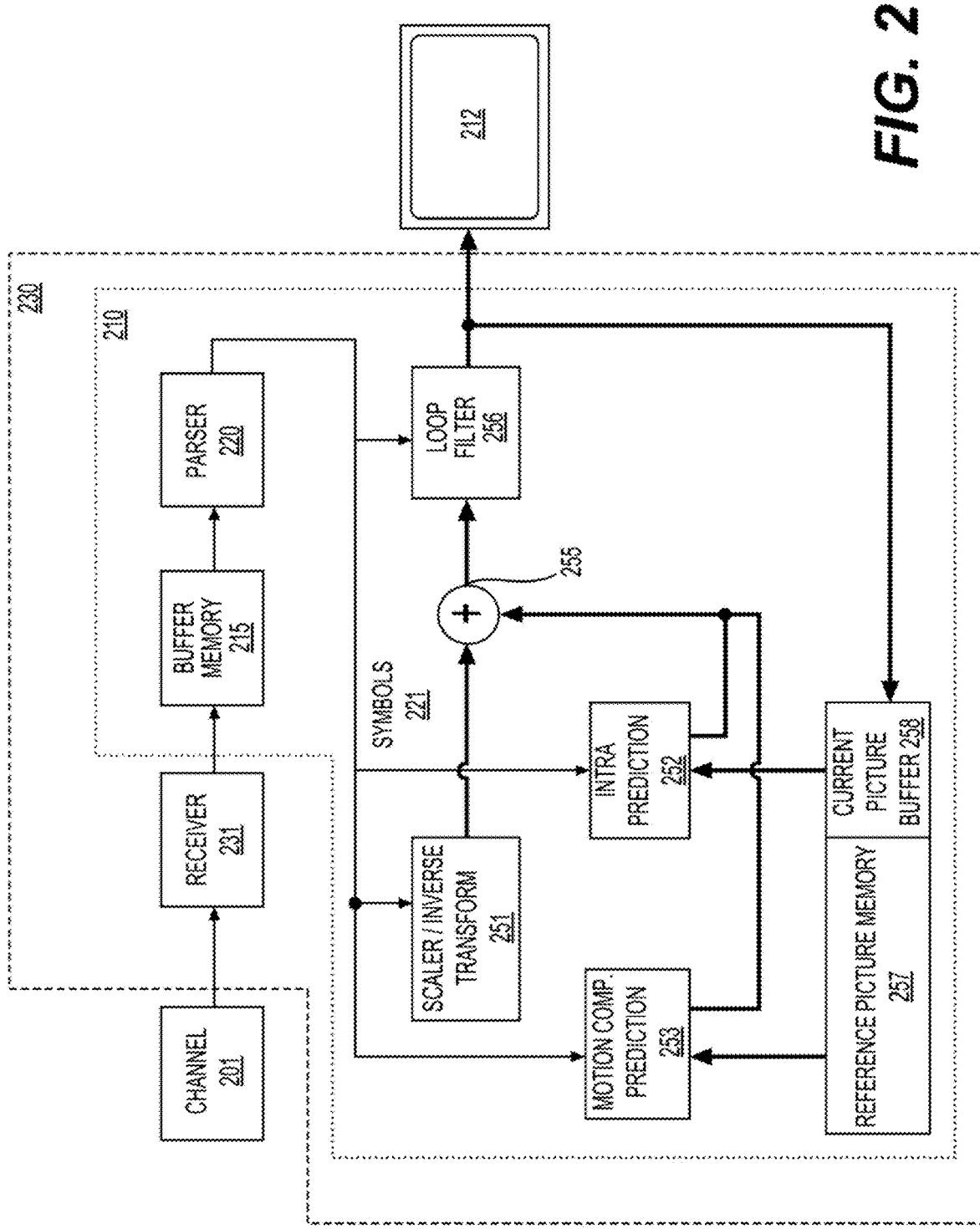
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220).

The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
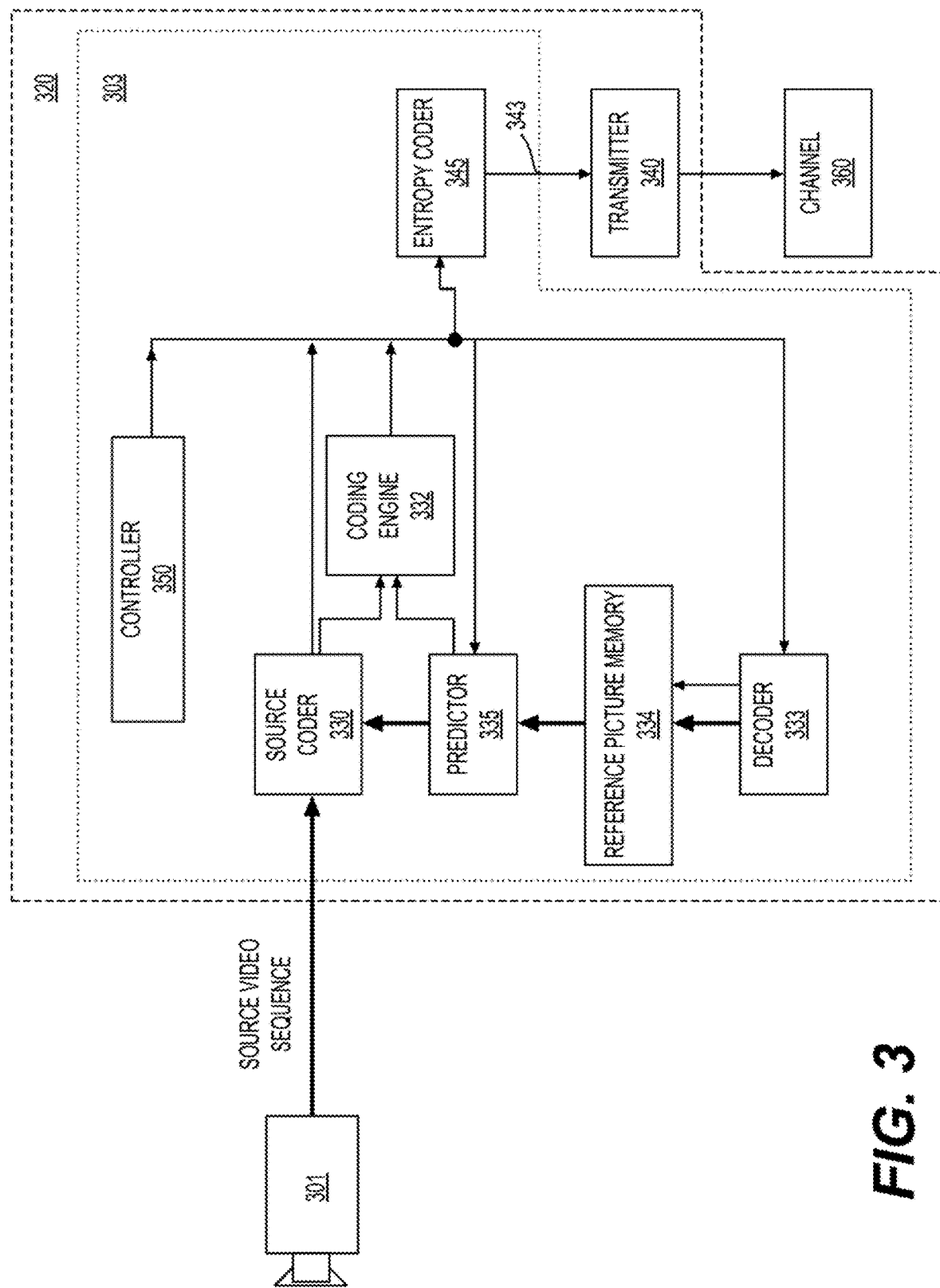
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for motion compensated picture boundary padding (also referred to as motion compensation boundary padding). The techniques for motion compensated picture boundary padding can include deriving the motion information for the motion compensated picture boundary padding and/or signaling the motion information for the motion compensated picture boundary padding.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

Figure 4:
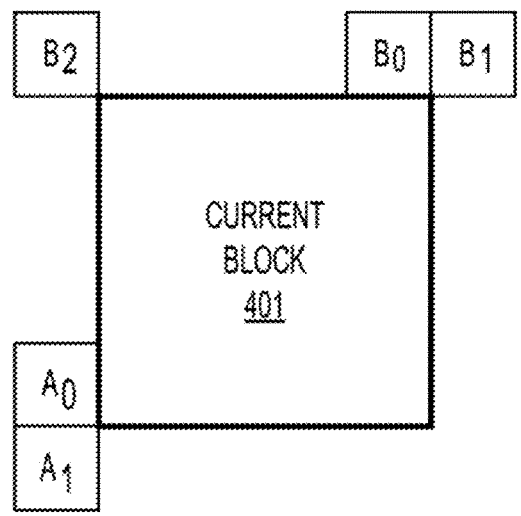
FIG. 4 shows positions of spatial merge candidates according to an embodiment of the disclosure.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

Figure 5:
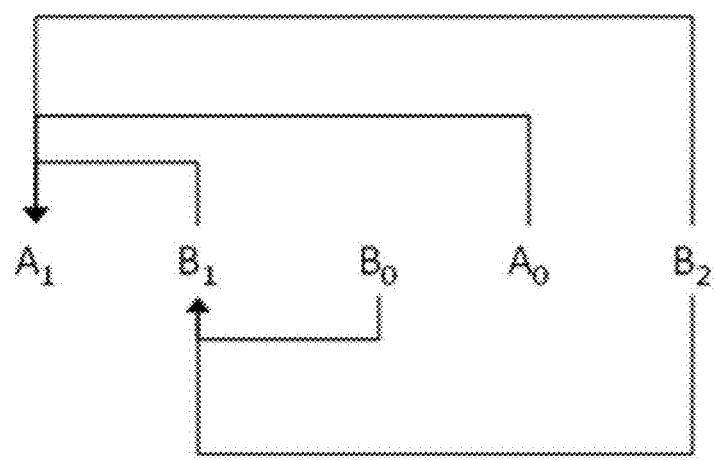
FIG. 5 shows candidate pairs that are considered for a redundancy check of spatial merge candidates according to an embodiment of the disclosure.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 6:
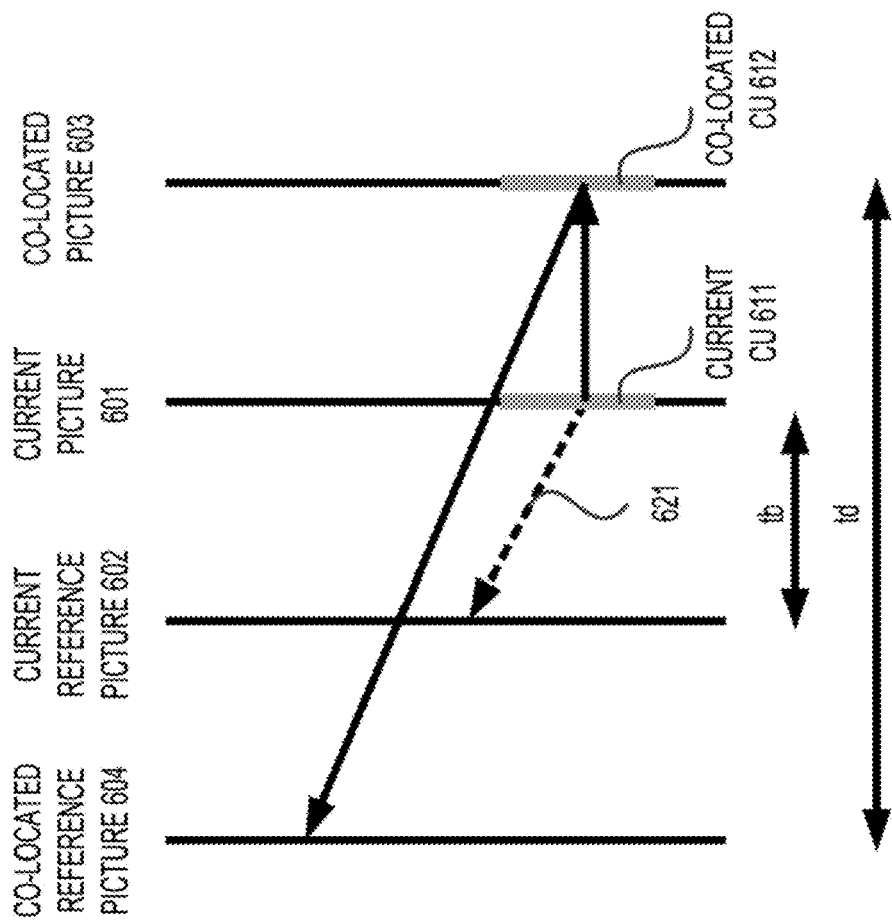
FIG. 6 shows exemplary motion vector scaling for a temporal merge candidate.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero.

Figure 7:
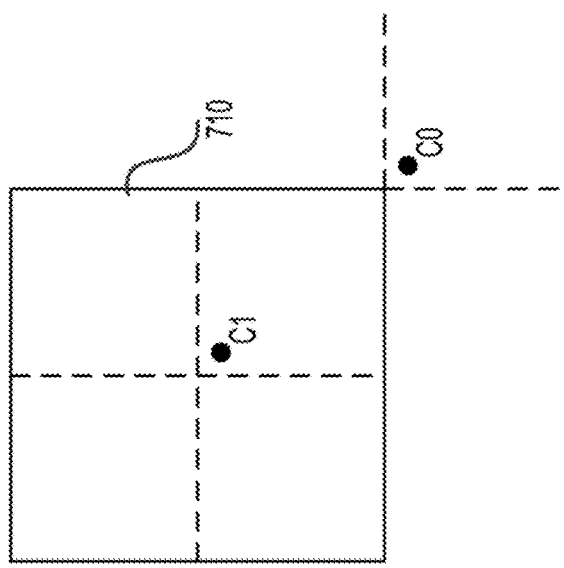
FIG. 7 shows exemplary candidate positions (e.g., C0 and C1) for a temporal merge candidate of a current CU.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

Figure 8A:
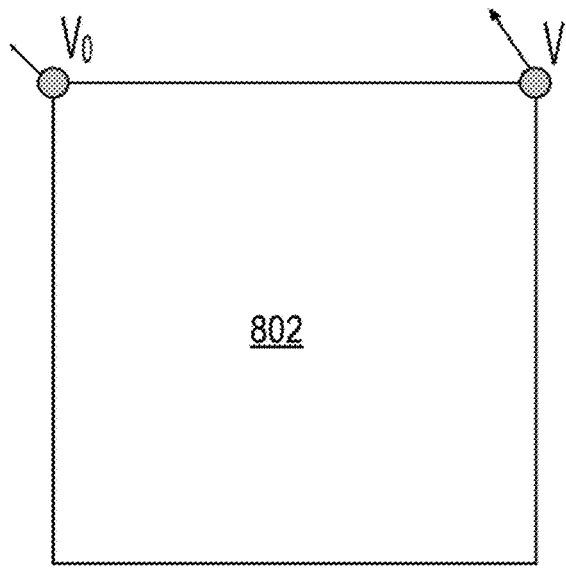
FIGS. 8A-8B show affine motion fields in some examples.
Figure 8B:
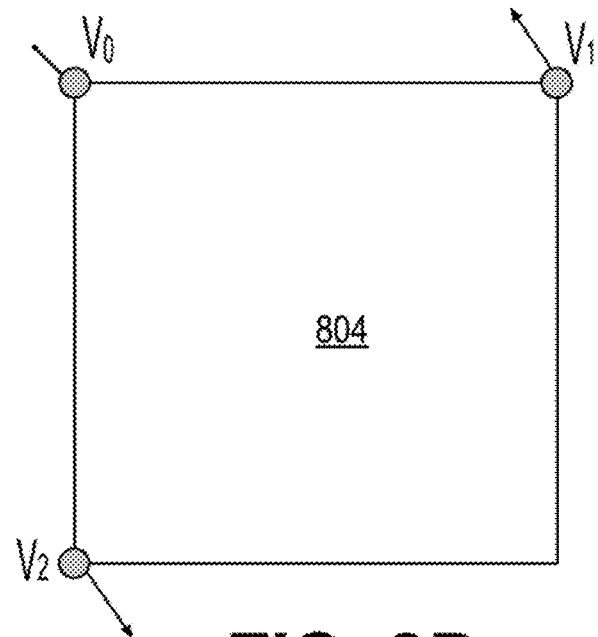

In HEVC, a translation motion model is applied for motion compensation prediction (MCP). While in the real world, many kinds of motions can exist, such as zoom in/out, rotation, perspective motions, and other irregular motions. A block-based affine transform motion compensation prediction can be applied, such as in VTM. FIG. 8A shows an affine motion field of a block (802) described by motion information of two control points (4-parameter). FIG. 8B shows an affine motion field of a block (804) described by three control point motion vectors (6-parameter).

As shown in FIG. 8A, in the 4-parameter affine motion model, a motion vector at a sample location (x,y) in the block (802) can be derived in Eq. (1) as follows:

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \quad \text{Eq. (1)}$$

where $mv_x$ can be the motion vector in a first direction (or X direction) and $mv_y$ can be the motion vector in a second direction (or Y direction). The motion vector can also be described in Eq. (2):

$$\begin{cases} mv_x = ax + by + c \\ mv_y = -bx + ay + f \end{cases} \qquad \text{Eq. (2)}$$

As shown in FIG. 8B, in the 6-parameter affine motion model, a motion vector at a sample location (x, y) in the block (1304) can be derived in Eq. (3) as follows:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \qquad \text{Eq. (3)}$$

The 6-parameter affine motion model can also described in Eq. (4) as follows:

$$\begin{cases} mv_x = ax + by + c \\ mv_y = dx + ey + f \end{cases} \qquad \text{Eq. (4)}$$

As shown in Eq. (1) and Eq. (3), ($mv_{0x}$, $mv_{0y}$) can be a motion vector of a top-left corner control point. ($mv_{1x}$, $mv_{1y}$) can be motion vector of a top-right corner control point. ($mv_{2x}$, $mv_{2y}$) can be a motion vector of a bottom-left corner control point.

Figure 9:
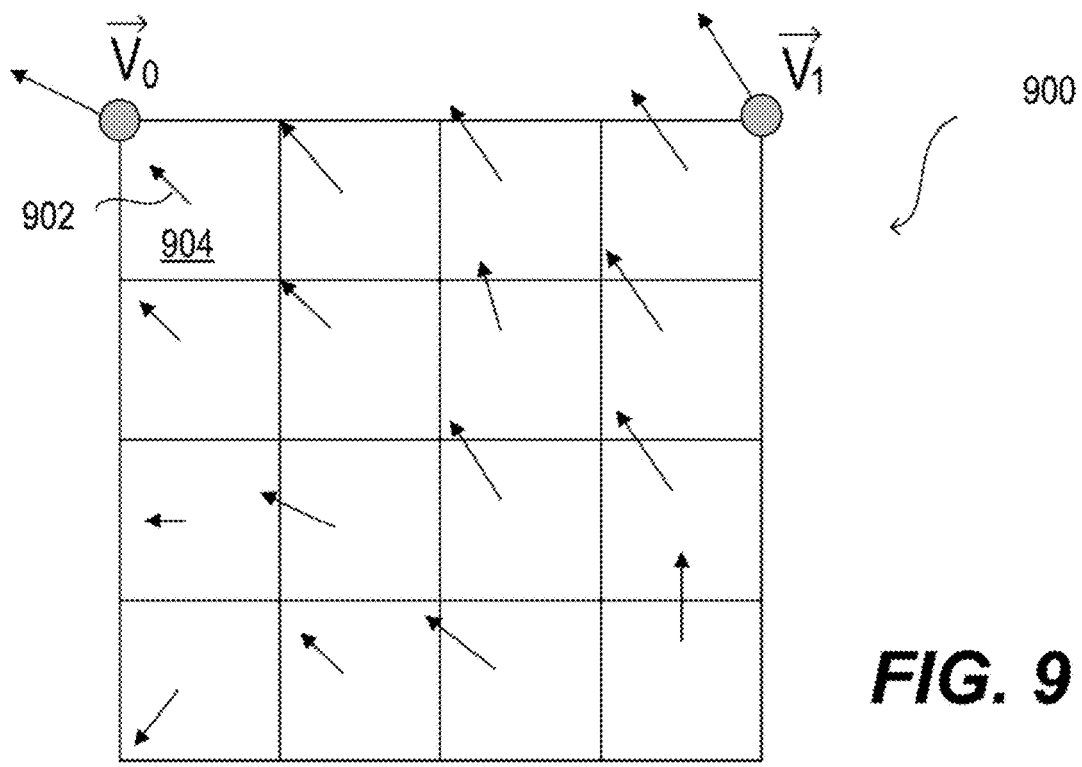
FIG. 9 shows block based affine transform prediction in some examples.

As shown in FIG. 9, to simplify the motion compensation prediction, block based affine transform prediction can be applied. To derive a motion vector of each 4×4 luma sub-block, a motion vector of a center sample (e.g., (902)) of each sub-block (e.g., (904)) in a current block (900) can be calculated according to the equations (1)-(4), and rounded to 1/16 fraction accuracy. Motion compensation interpolation filters can then be applied to generate the prediction of each sub-block with the derived motion vector. A sub-block size of chroma-components can also be set as 4×4. The MV of a 4×4 chroma sub-block can be calculated as an average of MVs of four corresponding 4×4 luma sub-blocks.

In affine merge prediction, an affine merg (AF_MERGE) mode can be applied for CUs with both a width and a height larger than or equal to 8. CPMVs of a current CU can be generated based on motion information of spatial neighboring CUs. Up to five CPMVP candidates can be applied for the affine merge prediction and an index can be signalled to indicate which one of the five CPMVP candidates can be used for the current CU. In affine merge prediction, three types of CPMV candidate can be used to form the affine merge candidate list: (1) inherited affine merge candidates that are extrapolated from CPMVs of neighbour CUs, (2) constructed affine merge candidates with CPMVPs that are derived using translational MVs of neighbour CUs, and (3) Zero MVs.

Figure 10:
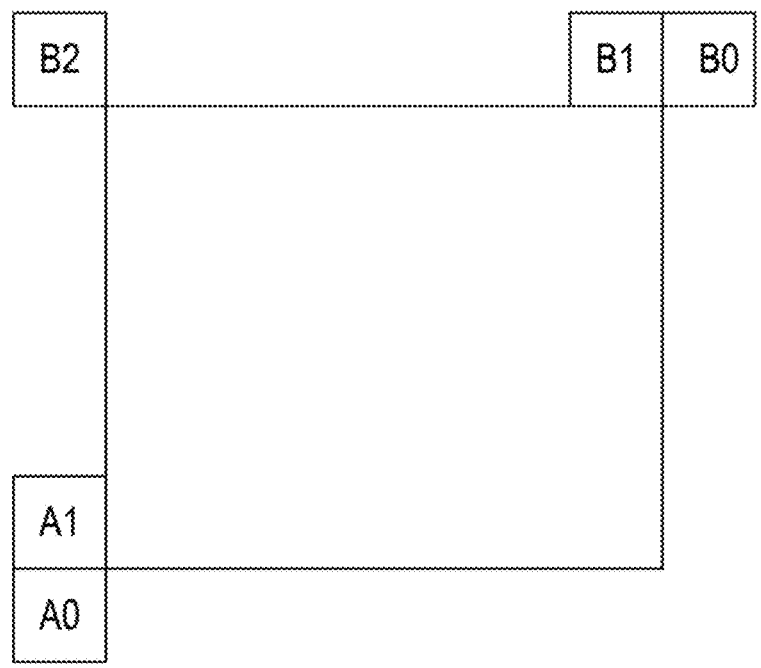
FIG. 10 shows candidate blocks in some examples.
Figure 11:
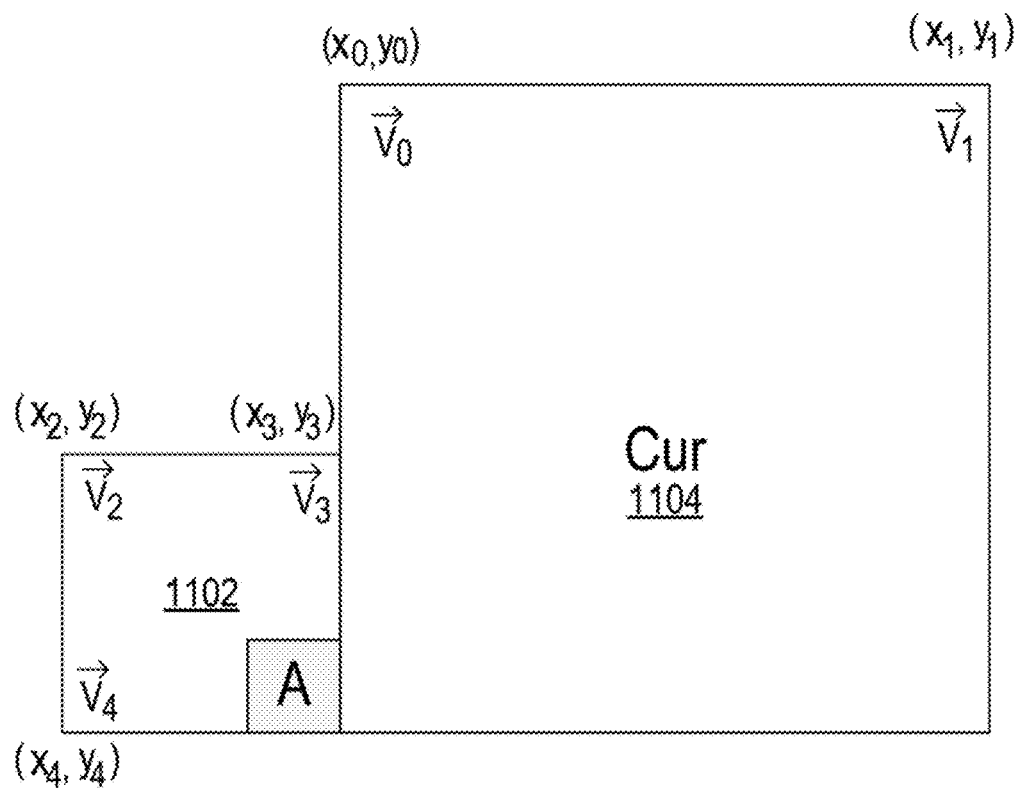
FIG. 11 shows control point motion vectors in some examples.

In VTM3, a maximum of two inherited affine candidates can be applied. The two inherited affine candidates can be derived from an affine motion model of neighboring blocks. For example, one inherited affine candidate can be derived from left neighboring CUs and the other inherited affine candidate can be derived from above neighboring CUs. Exemplary candidate blocks can be shown in FIG. 10. As shown in FIG. 10, for a left predictor (or a left inherited affine candidate), a scan order can be A0→A1, and for an above predictor (or an above inherited affine candidate), a scan order can be B0→B1→B2. Thus, only the first available inherited candidate from each side can be selected. No pruning check may be performed between two inherited candidates. When a neighboring affine CU is identified, control point motion vectors of the neighboring affine CU can be used to derive the CPMVP candidate in the affine merge list of the current CU. As shown in FIG. 11, when a neighboring left bottom block A of a current block (1104) is coded in affine mode, motion vectors $v_2$, $v_3$ and $v_4$ of a top left corner, an above right corner, and a left bottom corner of a CU (1102) which contains the block A can be attained. When the block A is coded with 4-parameter affine model, two CPMVs of the current CU (1104) can be calculated according to $v_2$, and $v_3$ of the CU (1102). In a case that block A is coded with a 6-parameter affine model, three CPMVs of the current CU (1104) can be calculated according to $v_2$, $v_3$ and $v_4$ of the CU (1102).

Figure 12:
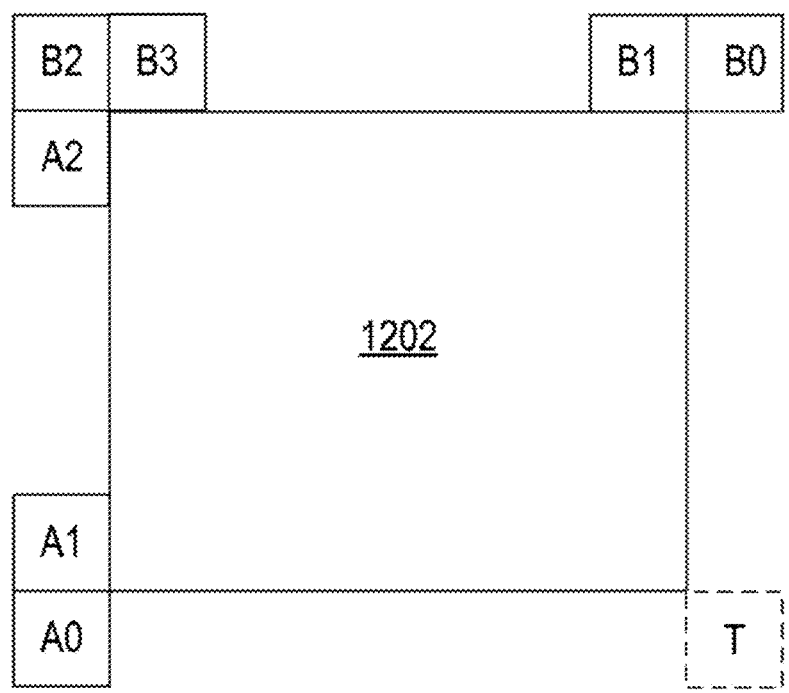
FIG. 12 shows spatial neighbors and a temporal neighbor in some examples.

A constructed affine candidate of a current block can be a candidate that is constructed by combining neighbor translational motion information of each control point of the current block. The motion information of the control points can be derived from specified spatial neighbors and a temporal neighbor that can be shown in FIG. 12. As shown in FIG. 12, $CPMV_k$ (k=1, 2, 3, 4) represents a k-th control point of a current block (1202). For $CPMV_1$, B2→B3→A2 blocks can be checked and an MV of the first available block can be used. For $CPMV_2$, B1→B0 blocks can be checked. For $CPMV_3$, A1→A0 blocks can be checked. TMVP can be used as $CPMV_4$ if $CPM_4$ is not available.

After MVs of four control points are attained, affine merge candidates can be constructed for the current block (1702) based on motion information of the four control points. For example, the affine merge candidates can be constructed based on combinations of the MVs of the four control points in an order as follows: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, and {$CPMV_1$, $CPMV_3$}.

The combination of 3 CPMVs can construct a 6-parameter affine merge candidate and the combination of 2 CPMVs can construct a 4-parameter affine merge candidate. To avoid a motion scaling process, if reference indices of control points are different, a related combination of control point MVs can be discarded.

After inherited affine merge candidates and constructed affine merge candidate are checked, if the list is still not full, zero MVs can be inserted to an end of the list.

In affine AMVP prediction, an affine AMVP mode can be applied for CUs with both a width and a height larger than or equal to 16. An affine flag in CU level can be signalled in the bitstream to indicate whether affine AMVP mode is used and then another flag can be signaled to indicate whether a 4-parameter affine or a 6-parameter affine is applied. In affine AMVP prediction, a difference of CPMVs of a current CU and predictors of the CPMVPs of the current CU can be signalled in the bitstream. A size of an affine AMVP candidate list can be 2 and the affine AMVP candidate list can be generated by using four types of CPMV candidate in an order as follows:

(1) Inherited affine AMVP candidates that are extrapolated from the CPMVs of the neighbour CUs,
(2) Constructed affine AMVP candidates with CPMVPs that are derived using the translational MVs of the neighbour CUs,
(3) Translational MVs from neighboring CUs, and
(4) Zero MVs.

A checking order of inherited affine AMVP candidates can be the same as a checking order of inherited affine merge candidates. To determine an AVMP candidate, only an affine CU that has the same reference picture as the current block can be considered. No pruning process may be applied when an inherited affine motion predictor is inserted into the candidate list.

A constructed AMVP candidate can be derived from specified spatial neighbors. As shown in FIG. 12, the same checking order can be applied as the checking order in affine merge candidate construction. In addition, a reference picture index of a neighboring block can also be checked. A first block in the checking order can be inter coded and have the same reference picture as the current CU (1202). One constructed AMVP candidate can be determined when the current CU (1202) is coded with a 4-parameter affine mode, and mv$_0$ and mv$_1$ are both available. The constructed AMPV candidate can further be added to the affine AMVP list. When the current CU (1202) is coded with a 6-parameter affine mode, and all three CPMVs are available, the constructed AMVP candidate can be added as one candidate in the affine AMVP list. Otherwise, the constructed AMVP candidate can be set as unavailable.

If candidates in the affine AMVP list are still less than 2 after the inherited affine AMVP candidates and the constructed AMVP candidate are checked, mv$_0$, mv$_1$ and mv$_2$ can be added, in order. The mv$_0$, mv$_1$ and mv$_2$ can function as translational MVs to predict all control point MVs of the current CU (e.g., (1202)) when available. Finally, zero MVs can be used to fill the affine AMVP list if the affine AMVP is still not full.

Subblock-based affine motion compensation can save memory access bandwidth and reduce computation complexity compared to pixel based motion compensation, at the cost of a prediction accuracy penalty. To achieve a finer granularity of motion compensation, prediction refinement with optical flow (PROF) can be used to refine the subblock-based affine motion compensated prediction without increasing the memory access bandwidth for motion compensation. In VVC, after the subblock-based affine motion compensation is performed, a luma prediction sample can be refined by adding a difference derived by an optical flow equation. The PROF can be described in four steps as follows:

Step (1): the subblock-based affine motion compensation can be performed to generate subblock prediction I(i, j).

Step (2): spatial gradients g$_x$(i,j) and g$_y$(i, j) of the subblock prediction can be calculated at each sample location using a 3-tap filter [−1, 0, 1]. The gradient calculation can be the same as gradient calculation in BDOF. For example, the spatial gradients g$_x$(i,j) and g$_y$(i,j) can be calculated based on Eq. (5) and Eq. (6) respectively.

$$g_x(i,j)=(I(i+1,j)\gg shift1)-(I(i-1,j)\gg shift1) \quad \text{Eq. (5)}$$

$$g_y(i,j)=(I(i,j+1)\gg shift1)-(I(i,j-1)\gg shift1) \quad \text{Eq. (6)}$$

As shown in equations (5) and (6), shift1 can be used to control a precision of the gradient. Subblock (e.g., 4×4) prediction can be extended by one sample on each side for the gradient calculation. To avoid additional memory bandwidth and additional interpolation computation, extended samples on extended borders can be copied from a nearest integer pixel position in the reference picture.

Figure 13:
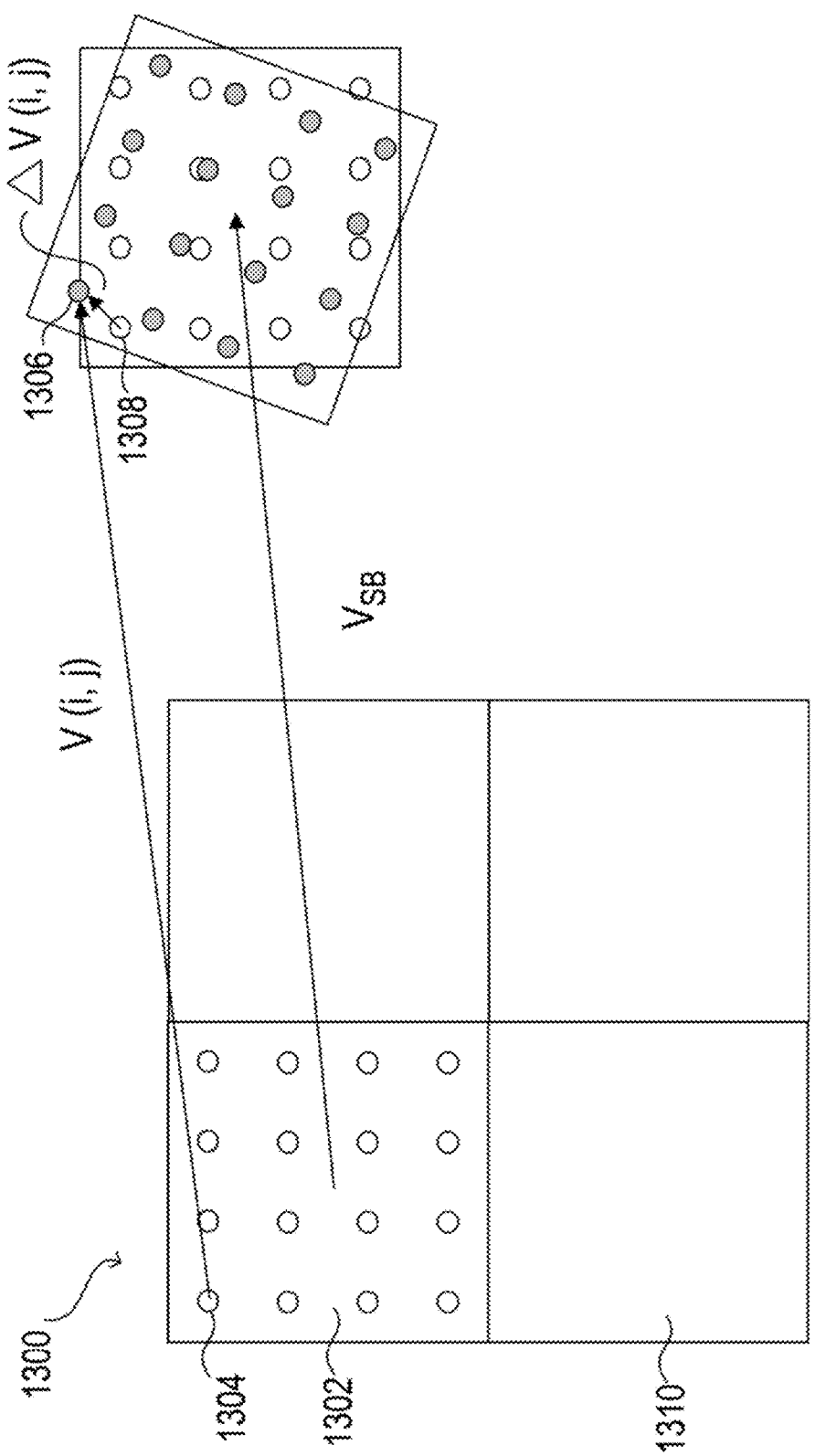
FIG. 13 shows an exemplary illustration of the difference between the sample motion vector and the subblock motion vector.

Step (3): luma prediction refinement can be calculated by an optical flow equation as shown in Eq. (7).

$$\Delta I(i,j)=g_x(i,j)*\Delta v_x(i,j)+g_y(i,j)*\Delta v_y(i,j) \quad \text{Eq. (7)}$$

where Δv(i,j) can be a difference between a sample MV computed for a sample location (i,j), denoted by v(i,j), and a subblock MV, denoted by v$_{SB}$, of a subblock to which the sample (i,j) belongs. FIG. 13 shows an exemplary illustration of the difference between the sample MV and the subblock MV. As shown in FIG. 13, a subblock (1302) can be included in a current block (1300) and a sample (1304) can be included in the subblock (1302). The sample (1304) can include a sample motion vector v(i,j) that corresponds to a reference pixel (1306). The subblock (1302) can include a subblock motion vector v$_{SB}$. Based on the subblock motion vector v$_{SB}$, the sample (1304) can correspond to a reference pixel (1308). A difference between the sample MV and the subblock MV, denoted by Δv(i,j), can be indicated by a difference between the reference pixel (1306) and the reference pixel (1308). The Δv(i, j) can be quantized in a unit of 1/32 luma sample precision.

Since affine model parameters and a sample location relative to a subblock center may not be changed from a subblock to another subblock, Δv(i,j) can be calculated for a first subblock (e.g., (1302)), and reused for other subblocks (e.g., (1310)) in the same CU (e.g., (1300)). Let dx(i,j) be a horizontal offset and dy(i,j) be a vertical offset from a sample location (i,j) to a center of a subblock (x$_{SB}$, y$_{SB}$), Δv(x, y) can be derived by Eq. (8) and Eq. (9) as follows:

$$\begin{cases} dx(i,j) = i - x_{SB} \\ dy(i,j) = j - y_{SB} \end{cases} \quad \text{Eq. (8)}$$

$$\begin{cases} \Delta v_x(i,j) = C*dx(i,j) + D*dy(i,j) \\ \Delta v_y(i,j) = E*dx(i,j) + F*dy(i,j) \end{cases} \quad \text{Eq. (9)}$$

In order to keep accuracy, the center of the subblock (x$_{SB}$, y$_{SB}$) can be calculated as ((W$_{SB}$−1)/2, (H$_{SB}$−1)/2), where W$_{SB}$ and H$_{SB}$ are the subblock width and height, respectively.

Once Δv(x, y) is obtained, parameters of the affine model can be obtained. For example, for a 4-parameter affine model, the parameters of the affine model can be shown in Eq. (10).

$$\begin{cases} C = F = \dfrac{v_{1x} - v_{0x}}{w} \\ E = -D = \dfrac{v_{1y} - v_{0y}}{w} \end{cases} \quad \text{Eq. (10)}$$

For a 6-parameter affine model, the parameters of the affine model can be shown in Eq. (11).

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad \text{Eq. (11)}$$

where (v$_{0x}$, v$_{0y}$), (v$_{1x}$, v$_{1y}$), (v$_{2x}$, v$_{2y}$) can be a top-left control point motion vector, a top-right control point motion vector, and a bottom-left control point motion vector respectively, and w and h can be a width and a height of the CU respectively.

Step (4): finally, the luma prediction refinement ΔI(i,j) can be added to the subblock prediction I(i,j). A final prediction I′ can be generated as shown in Eq. (12).

$$I'(i,j)=I(i,j)+\Delta I(i,j) \quad \text{Eq. (12)}$$

PROF may not be applied in two cases for an affine coded CU: (1) all control point MVs are the same, which indicates that the CU only has translational motion, and (2) the affine motion parameters are greater than a specified limit because the subblock-based affine MC is degraded to CU-based MC to avoid a large memory access bandwidth requirement.

To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. Each subblock of a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. In the second step, availability of an SbTMVP candidate can be checked and a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in the collocated picture for each subblock in the current CU that is in the current picture. If the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated picture can be used to improve MV prediction and a merge mode for CUs in the current picture. In an example, the same collocated picture used by the TMVP mode is used in the SbTVMP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated picture (e.g., the collocated block is the bottom-right or a center block relative to the current CU) while the SbTMVP mode can apply a motion shift before fetching the temporal motion information from the collocated picture. In an example, the motion shift used in the SbTMVP mode is obtained from an MV of one of spatial neighboring blocks of the current CU.

Figure 14:
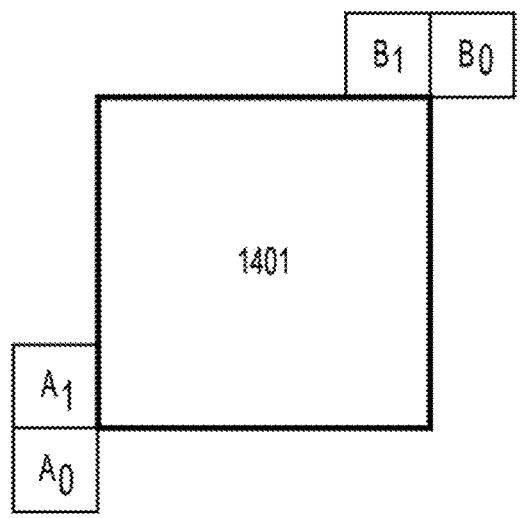
FIGS. 14-15 show an exemplary subblock-based temporal motion vector prediction (SbTMVP) process used in the SbTMVP mode.
Figure 15:
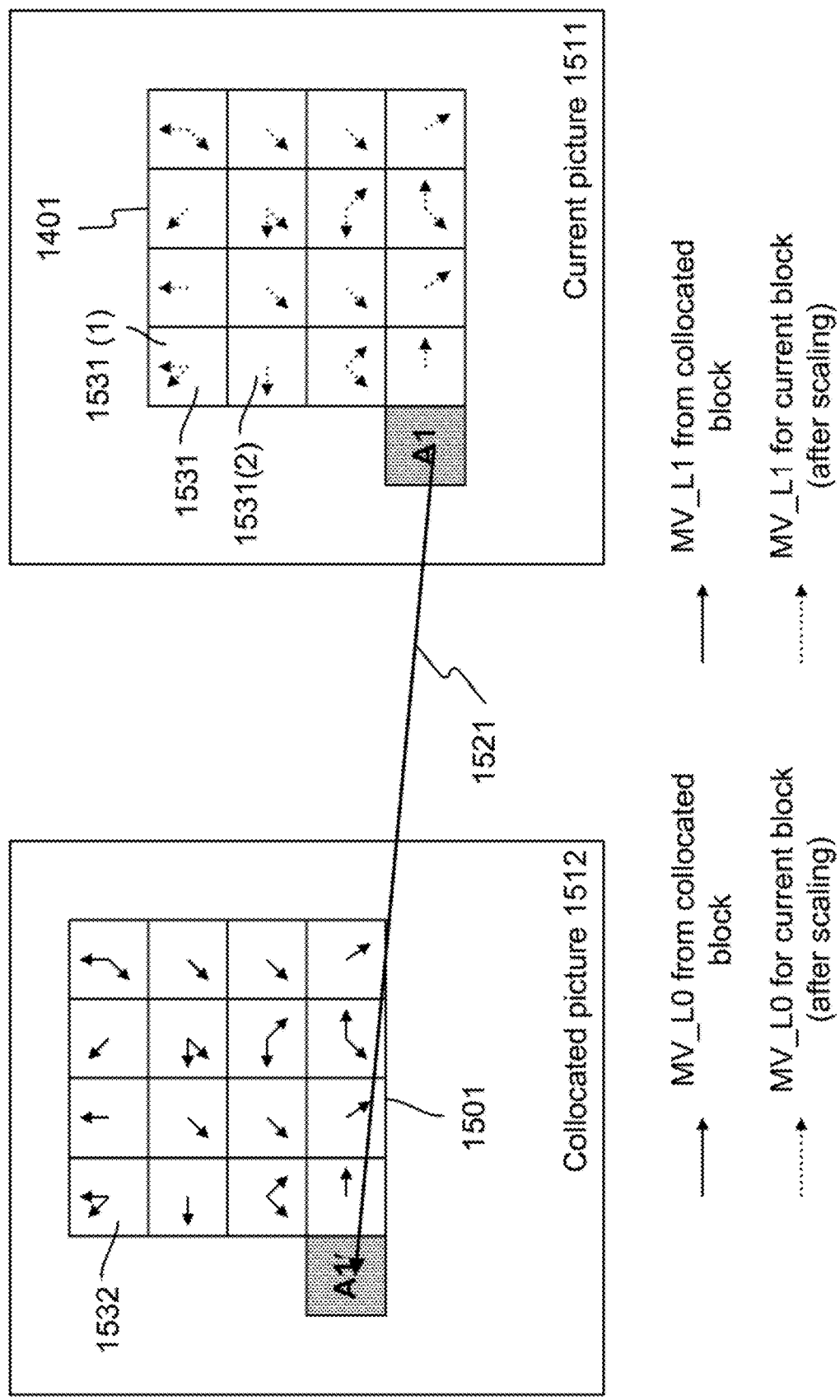

FIGS. 14-15 show an exemplary SbTMVP process used in the SbTMVP mode. The SbTMVP process can predict MVs of sub-CUs (e.g., subblocks) within a current CU (e.g., a current block) (1401) in a current picture (1511), for example, in two steps. In the first step, a spatial neighbor (e.g., A1) of the current block (1401) in FIGS. 14-15 is examined. If the spatial neighbor (e.g., A1) has an MV (1521) that uses a collocated picture (1512) as a reference picture of the spatial neighbor (e.g., A1), the MV (1521) can be selected to be a motion shift (or a DV) to be applied to the current block (1401). If no such MV (e.g., an MV that uses the collocated picture (1512) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (1521) identified in the first step can be applied to the current block (1401) (e.g., the DV (1521) is added to coordinates of the current block) to obtain sub-CU level motion information (e.g., including MVs and reference indices) from the collocated picture (1512). In the example shown in FIG. 15, the motion shift or the DV (1521) is set to be the MV of the spatial neighbor A1 (e.g., a block A1) of the current block (1401). For each sub-CU or subblock (1531) in the current block (1401), motion information of a corresponding collocated block (1501) (e.g., motion information of the smallest motion grid that covers a center sample of the collocated block (1501)) in the collocated picture (1512) can be used to derive the motion information for the sub-CU or subblock (1531). After the motion information of the collocated sub-CU (1532) in the collocated block (1501) is identified, the motion information of the collocated sub-CU (1532) can be converted to the motion information (e.g., MV(s) and one or more reference indices) of the current sub-CU (1531), for example, using a scaling method, such as in a similar way as the TMVP process used in HEVC, where temporal motion scaling is applied to align reference pictures of temporal MVs to reference pictures of a current CU.

The motion field of the current block (1401) derived based on the DV (1521) can include motion information of each subblock (1531) in the current block (1401), such as MV(s) and one or more associated reference indices. The motion field of the current block (1401) can also be referred to as an SbTMVP candidate and corresponds to the DV (1521).

FIG. 15 shows an example of the motion field or the SbTMVP candidate of the current block (1401). The motion information of the subblock (1531(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (1531(2)) that is uni-predicted includes an MV and an index indicating a reference picture in L0 or L1.

In an example, the DV (1521) is applied to a central position of the current block (1401) to locate a displaced central position in the collocated picture (1512). If a block including the displaced central position is not inter-coded, the SbTMVP candidate is considered not available. Otherwise, if a block (e.g., the collocated block (1501)) including the displaced central position is inter-coded, the motion information of the central position of the current block (1401), referred to as central motion of the current block (1401), can be derived from motion information of the block including the displaced central position in the collocated picture (1512). In an example, a scaling process can be used to derive the central motion of the current block (1401) from the motion information of the block including the displaced central position in the collocated picture (1512). When the SbTMVP candidate is available, the DV (1521) can be applied to find the corresponding subblock (1532) in the collocated picture (1512) for each subblock (1531) of the current block (1401). The motion information of the corresponding subblock (1532) can be used to derive the motion information of the subblock (1531) in the current block (1401), such as in the same way used to derive the central motion of the current block (1901). In an example, if the corresponding subblock (1532) is not inter-coded, the motion information of the current subblock (1531) is set to be the central motion of the current block (1401).

In some examples, bi-prediction with CU-level weight (BCW) can be used to weight predictions from different reference pictures differently. In an example (e.g.., HEVC), the bi-prediction signal is generated by averaging two prediction signals obtained from two different reference pictures and/or using two different motion vectors. In some examples (e.g., VVC), the bi-prediction mode is extended beyond simple averaging to allow weighted averaging of the two prediction signals, such as shown by Eq. (13):

$$P_{bi-pred}=((8-w) \times P_0 + w \times P_1 + 4) \gg 3 \qquad \text{Eq. (13)}$$

where $P_{bi-pred}$ denotes the bi-prediction signal, $P_0$ denotes a first prediction signal from a first reference picture, $P_1$ denotes a second prediction signal from a second reference picture, and w denotes a weight parameter.

In some examples, five values are allowed for the BCW weight in the weighted averaging bi-prediction, for example $w \in \{-2, 3, 4, 5, 10\}$. In some examples, the BCW weights can be represented by BCW weight indices. For each bi-predicted CU, the value of the weight parameter w is determined in one of two ways: 1) for a non-merge CU, a weight index is signalled after the motion vector difference, the weight index indicates a value selected from a list; 2) for a merge CU, the weight index is inferred from neighbouring blocks based on the merge candidate index. In some examples, BCW is only applied to CUs with 256 or more luma samples (i.e., CU width times CU height is greater than or equal to 256). In an example, for low-delay pictures, all 5 weight values are used. For non-low-delay pictures, only 3 weights (e.g., $w \in \{3, 4, 5\}$) are used.

In some examples, at the encoder side, a search algorithm, such as a fast search algorithm, is applied to find the weight index without significantly increasing the encoder complexity. When BCW is combined with AMVR, unequal weights are only conditionally checked for 1-pel and 4-pel motion vector precisions if the current picture is a low-delay picture.

In some examples, when BCW is combined with affine, affine ME is performed for unequal weights if and only if the affine mode is selected as the current best mode.

In some examples, when the two reference pictures in bi-prediction are the same, unequal weights are conditionally checked.

In some examples, unequal weights are not searched when certain conditions are met, such as depending on the POC distance between current picture and its reference pictures, the coding QP, and the temporal level.

In some examples, the weight index for BCW is coded using a first context coded bin followed by bypass coded bins. The first context coded bin indicates if equal weight is used; and if unequal weight is used, additional bins are signalled using bypass coding to indicate which unequal weight is used from the list of values for weight parameter.

Some video codecs, such as the H.264/AVC and HEVC standards, support a coding tool that is referred to as weighted prediction (WP) to efficiently code video content with fading. Support for WP is also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

Bi-directional optical flow (BDOF) in VVC, was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. BDOF can be applied to a CU if the CU satisfies conditions as follows:

(1) The CU is coded using "true" bi-prediction mode, i.e., one of the two reference pictures is prior to the current picture in display order and the other is after the current picture in display order, (2) The distances (e.g., POC difference) from two reference pictures to the current picture are the same, (3) Both reference pictures are short-term reference pictures, (4) The CU is not coded using affine mode or the SbTMVP merge mode, (5) CU has more than 64 luma samples, (6) Both CU height and CU width are larger than or equal to 8 luma samples, (7) BCW weight index indicates equal weight, (8) Weighted prediction (WP) is not enabled for the current CU, and (9) CIIP mode is not used for the current CU.

BDOF may be only applied to a luma component. As the name of BDOF indicates, the BDOF mode can be based on an optical flow concept, which assumes that a motion of an object is smooth. For each 4×4 subblock, a motion refinement $(v_x, v_y)$ can be calculated by minimizing a difference between L0 and L1 prediction samples. The motion refinement can then be used to adjust the bi-predicted sample values in the 4×4 subblock. BDOF can include steps as follows.

First, horizontal and vertical gradients, $$\frac{\partial I^{(k)}}{\partial x}(i, j) \text{ and } \frac{\partial I^{(k)}}{\partial y}(i, j),$$

k=0,1, of the two prediction signals from the reference list L0 and the reference list L1 can be computed by directly calculating a difference between two neighboring samples. The horizontal and vertical gradients can be provided in equations (14) and (15) as follows:

$$\frac{\partial I^{(k)}}{\partial x}(i, j) = \left(\left(I^{(k)}(i+1, j) \gg \text{shift1}\right) - \left(I^{(k)}(i-1, j) \gg \text{shift1}\right)\right) \qquad \text{Eq. (14)}$$

$$\frac{\partial I^{(k)}}{\partial y}(i, j) = \left(\left(I^{(k)}(i, j+1) \gg \text{shift1}\right) - \left(I^{(k)}(i, j-1) \gg \text{shift1}\right)\right) \qquad \text{Eq. (15)}$$

where $I^{(k)}(i,j)$ can be a sample value at coordinate (i,j) of the prediction signal in list k, k=0,1, and shift1 can be calculated based on a luma bit depth, bitDepth, as shift1=max(6, bitDepth-6).

Then, an auto- and cross-correlation of the gradients, $S_1$, $S_2$, $S_3$, $S_5$ and $S_6$, can be calculated according to equations (16)-(20) as follows:

$$S_1 = \Sigma_{(i,j) \in \Omega} \text{Abs}(\psi_x(i,j)), \quad \text{Eq. (16)}$$

$$S_2 = \Sigma_{(i,j) \in \Omega} \psi_x(i,j) \# \text{Sign}(\psi_y(i,j)) \quad \text{Eq. (17)}$$

$$S_3 = \Sigma_{(i,j) \in \Omega} \theta(i,j) \cdot \text{Sign}(\psi_x(i,j)) \quad \text{Eq. (18)}$$

$$S_5 = \Sigma_{(i,j) \in \Omega} \text{Abs}(\psi_y(i,j)) \quad \text{Eq. (19)}$$

$$S_6 \Sigma_{(i,j) \in \Omega} \theta(i,j) \cdot \text{Sign}(\psi_y(i,j)) \quad \text{Eq. (20)}$$

where $\psi_x(i,j)$, $\psi_y(i,j)$, and $\theta(i,j)$ can be provided in equations (21)-(23) respectively.

$$\psi_x(i,j) = \left( \frac{\partial I^{(1)}}{\partial x}(i,j) + \frac{\partial I^{(0)}}{\partial x}(i,j) \right) \gg n_a \quad \text{Eq. (21)}$$

$$\psi_y(i,j) = \left( \frac{\partial I^{(1)}}{\partial y}(i,j) + \frac{\partial I^{(0)}}{\partial y}(i,j) \right) \gg n_a \quad \text{Eq. (22)}$$

$$\theta(i,j) = \left( I^{(1)}(i,j) \gg n_b \right) - \left( I^{(0)}(i,j) \gg n_b \right) \quad \text{Eq. (23)}$$

where $\Omega$ can be a 6×6 window around the 4×4 subblock, and the values of $n_a$ and $n_b$ can be set equal to min (1, bitDepth-11) and min (4, bitDepth-8), respectively.

The motion refinement $(v_x, v_y)$ can then be derived using the cross- and auto-correlation terms using equations (24) and (25) as follows:

$$v_x = S_1 > 0 ? \text{clip3}(-th'_{BIO}, th'_{BIO}, -((S_3 \cdot 2^{n_b - n_a}) \gg \lfloor \log_2 S_1 \rfloor )) : 0 \quad \text{Eq. (24)}$$

$$v_y = S_5 > 0 ? \text{clip3}(-th'_{BIO}, th'_{BIO}, - \\ ((S_6 \cdot 2^{n_b - n_a} - ((v_x S_{2,m}) \ll n_{S_2} + v_x S_{2,s})/2) \gg \lfloor \log_2 S_5 \rfloor )) : 0 \quad \text{Eq. (25)}$$

where $$S_{2,m} = S_2 \gg n_{S_2}, S_{2s} = S_2 \;\&\; (2^{n_{S_2}} - 1), th'_{BIO} = 2^{\max(5, BD-7)}.$$

$\lfloor \cdot \rfloor$ is a floor function, and $n_{S_2}=12$. Based on the motion refinement and the gradients, an adjustment can be calculated for each sample in the 4×4 subblock based on equation (26):

$$b(x,y) = \text{rnd} \\ \left( \left( v_x \left( \frac{\partial I^{(1)}(x,y)}{\partial x} - \frac{\partial I^{(0)}(x,y)}{\partial x} \right) + v_y \left( \frac{\partial I^{(1)}(x,y)}{\partial y} - \frac{\partial I^{(0)}(x,y)}{\partial y} \right) + 1 \right) / 2 \right) \quad \text{Eq. (26)}$$

Finally, the BDOF samples of the CU can be calculated by adjusting the bi-prediction samples in equation (27) as follows:

$$\text{pred}_{BDOF}(x,y) = (I^{(0)}(x,y) + I^{(1)}(x,y) + b(x,y) + o_{\text{offset}}) \gg \text{shift} \quad \text{Eq. (27)}$$

Values can be selected such that multipliers in the BDOF process do not exceed 15-bits, and a maximum bit-width of the intermediate parameters in the BDOF process can be kept within 32-bits.

Figure 16:
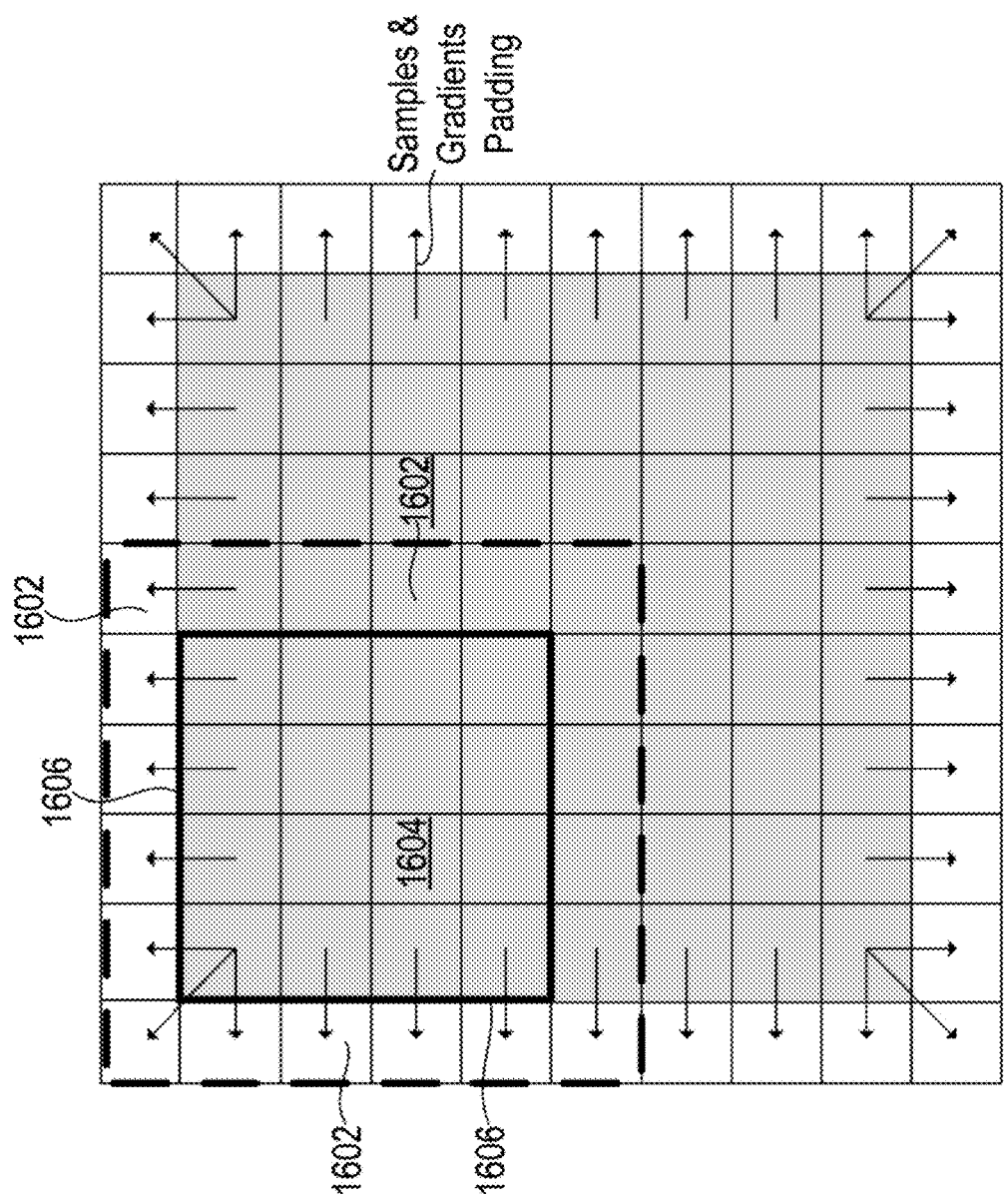
FIG. 16 shows extended coding unit region in some examples.

In order to derive the gradient values, some prediction samples $I^{(k)}$ (i,j) in the list k (k=0,1) outside of the current CU boundaries need to be generated. As shown in FIG. 16, BDOF in VVC can use one extended row/column (1602) around boundaries (1606) of a CU (1604). In order to control the computational complexity of generating the out-of-boundary prediction samples, prediction samples in an extended area (e.g., unshaded region in FIG. 16) can be generated by taking the reference samples at the nearby integer positions (e.g., using a floor( ) operation on the coordinates) directly without interpolation, and a normal 8-tap motion compensation interpolation filter can be used to generate prediction samples within the CU (e.g., the shaded region in FIG. 16). The extended sample values can be used in gradient calculation only. For the remaining steps in the BDOF process, if any samples and gradient values outside of the CU boundaries are needed, the samples and gradient values can be padded (e.g., repeated) from nearest neighbors of the samples and gradient values.

When a width and/or a height of a CU is larger than 16 luma samples, the CU can be split into subblocks with a width and/or a height equal to 16 luma samples, and the subblock boundaries can be treated as CU boundaries in the BDOF process. A maximum unit size for BDOF process can be limited to 16×16. For each subblock, the BDOF process can be skipped. When a sum of absolute difference (SAD) between the initial L0 and L1 prediction samples is smaller than a threshold, the BDOF process may not be applied to the subblock. The threshold can be set equal to (8×W×(H >>1), where W can indicate the width of the subblock, and H can indicate the height of the subblock. To avoid the additional complexity of a SAD calculation, the SAD between the initial L0 and L1 prediction samples calculated in DMVR process can be re-used in the BDOF process.

If BCW is enabled for a current block, i.e., the BCW weight index indicates unequal weight, then bi-directional optical flow can be disabled. Similarly, if WP is enabled for the current block, i.e., a luma weight flag (e.g., luma_weight_1x_flag) is 1 for either of the two reference pictures, then BDOF may also be also disabled. When a CU is coded with symmetric MVD mode or CIIP mode, BDOF may also be disabled.

In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 17:
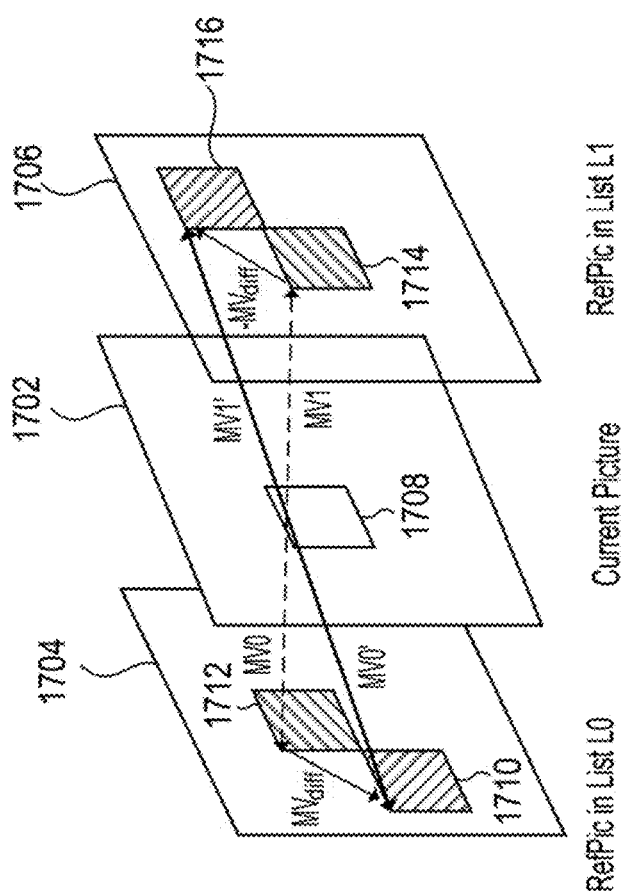
FIG. 17 shows an exemplary schematic view of a decoder side motion vector refinement in some examples.

FIG. 17 shows an exemplary schematic view of a BM-based decoder side motion vector refinement. As show in FIG. 17, a current picture (1702) can include a current block (1708). The current picture can include a reference picture list L0 (1704) and a reference picture list L1 (1706). The current block (1708) can include an initial reference block (1712) in the reference picture list L0 (1704) according to an initial motion vector MV0 and an initial reference block (1714) in the reference picture list L1 (1706) according to an initial motion vector MV1. A searching process can be performed around the initial MV0 in the reference picture list L0 (1704) and the initial MV1 in the reference picture list L1 (1706). For example, a first candidate reference block (1710) can be identified in the reference picture list L0 (1704) and a first candidate reference block (1716) can be identified in the reference picture list L1 (1706). A SAD between candidate reference blocks (e.g., (1710) and (1716)) based on each MV candidate (e.g., MV0' and MV1') around the initial MV (e.g., MV0 and MV1) can be calculated. A MV candidate with the lowest SAD can become the refined MV and used to generate a bi-predicted signal to predict the current block (1708).

The application of DMVR can be restricted and may only be applied for CUs which are coded based on modes and features, such as in VVC, as follows:

(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) BCW weight index indicates equal weight,
(8) weighted prediction (WP) is not enabled for the current block, and
(9) CIIP mode is not used for the current block.

The refined MV derived by the DMVR process can be used to generate inter prediction samples and be used in temporal motion vector prediction for future pictures coding. While the original MV can be used in the deblocking process and be used in spatial motion vector prediction for future CU coding.

In DVMR, search points can surround the initial MV and the MV offset can obey a MV difference mirroring rule. In other words, any points that are checked by DMVR, denoted by a candidate MV pair (MV0, MV1), can obey the MV difference mirroring rule that is shown in equations (28) and (29):

$$MV0'=MV0+MV\_offset \quad \text{Eq. (28)}$$

$$MV1'=MV1-MV\_offset \quad \text{Eq. (29)}$$

Where MV_offset can represent a refinement offset between the initial MV and the refined MV in one of the reference pictures. The refinement search range can be two integer luma samples from the initial MV. The searching can include an integer sample offset search stage and a fractional sample refinement stage.

For example, a 25 points full search can be applied for integer sample offset searching. The SAD of the initial MV pair can first be calculated. If the SAD of the initial MV pair is smaller than a threshold, the integer sample stage of DMVR can be terminated. Otherwise SADs of the remaining 24 points can be calculated and checked in a scanning order, such as a raster scanning order. The point with the smallest SAD can be selected as an output of integer sample offset searching stage. To reduce the penalty of the uncertainty of DMVR refinement, the original MV during the DMVR process can have a priority to be selected. The SAD between the reference blocks referred by the initial MV candidates can be decreased by ¼ of the SAD value.

The integer sample search can be followed by fractional sample refinement. To save the calculational complexity, the fractional sample refinement can be derived by using a parametric error surface equation, instead of an additional search with SAD comparison. The fractional sample refinement can be conditionally invoked based on the output of the integer sample search stage. When the integer sample search stage is terminated with a center having the smallest SAD in either the first iteration search or the second iteration search, the fractional sample refinement can further be applied.

In a parametric error surface-based sub-pixel offsets estimation, the center position cost and the costs at four neighboring positions from the center can be used to fit a 2-D parabolic error surface equation based on equation (30):

$$E(x,y)=A(x-x_{min})^2+B(y-y_{min})^2+C \quad \text{Eq. (30)}$$

where $(x_{min}, y_{min})$ can correspond to a fractional position with the least cost and C can correspond to a minimum cost value. By solving the equation (30) using the cost value of the five search points, the $(x_{min}, y_{min})$ can be computed in equations (31) and (32):

$$x_{min}=(E(-1,0)-E(1,0))/(2(E(-1,0)+E(1,0)-2E(0,0))) \quad \text{Eq. (31)}$$

$$y_{min}=(E(0,-1)-E(0,1))/(2((E(0,-1)+E(0,1)-2E(0,0))) \quad \text{Eq. (32)}$$

The value of $x_{min}$ and $y_{min}$ can be automatically constrained to be between −8 and 8 since all cost values are positive and the smallest value is E(0,0). The constraints of the value of $x_{min}$ and $y_{min}$ can correspond to a half pel (or pixel) offset with 1/16th-pel MV accuracy in VVC. The computed fractional $(x_{min}, y_{min})$ can be added to the integer distance refinement MV to get the sub-pixel accurate refinement delta MV.

Bilinear-interpolation and sample padding can be applied, such as in VVC. A resolution of MVs can be 1/16 luma samples, for example. Samples at a fractional position can be interpolated using an 8-tap interpolation filter. In DMVR, search points can surround an initial fractional-pel MV with an integer sample offset, therefore the samples of the fractional position need to be interpolated for DMVR search process. To reduce the calculation complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limit to 16×16.

In some examples (e.g., VVC), a geometric partitioning mode (GPM) is supported for inter prediction. The geometric partitioning mode is signalled using a CU-level flag as one kind of merge mode with other merge modes, such as the regular merge mode, the MMVD mode, the CIIP mode, the subblock merge mode, and the like. In some examples, a total of 64 partitions are supported by geometric partitioning mode for each possible CU size w×h=$2^m$×$2^n$ with m, n ∈{3 . . . 6}excluding 8×64 and 64×8.

In some examples, when the geometric partitioning mode is used, a CU is split into two parts by a geometrically located straight line that is also referred to as a splitting line.

Figure 18:
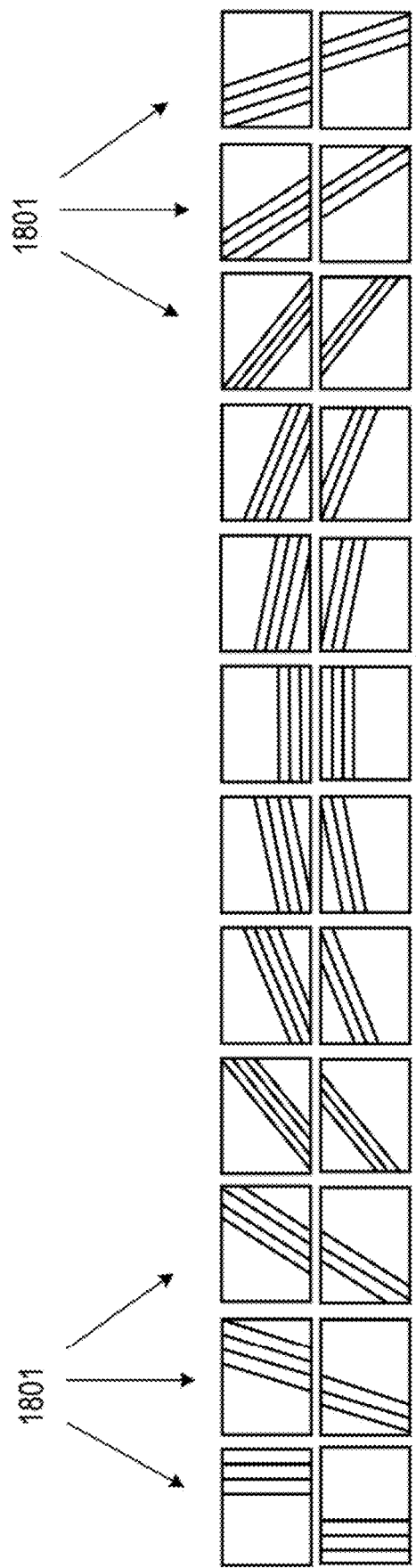
FIG. 18 shows examples of splitting lines for geometric partitioning mode in some examples.

FIG. 18 shows examples of splitting lines for geometric partitioning mode in some examples. The splitting lines are grouped by identical angles. Specifically, each rectangle (1801) in FIG. 18 represents a CU. Multiple parallel lines are shown in each rectangle. The multiple parallel lines correspond to splitting lines of an identical angle. The multiple splitting lines are of different offsets.

The location of a splitting line can be mathematically derived based on the angle and offset parameters of a specific partition. Each part of the two geometric partitions by the splitting line in the CU is inter-predicted using its own motion; only uni-prediction is allowed for each partition. Thus, each part has one motion vector and one reference index. The uni-prediction motion constraint is applied to ensure that a CU in GPM mode is able to be coded as the conventional bi-prediction, for example, two motion compensated predictions are performed for each CU.

In some examples, when geometric partitioning mode is used for the current CU, then a geometric partition index indicating the partition mode of the geometric partition (e.g., indicating angle and offset), and two merge indices (one for each partition) are further signalled. In some examples, the number of maximum GPM candidate size is signalled explicitly in SPS and specifies syntax binarization for GPM merge indices. After predicting each part of the geometric partition, the sample values along the geometric partition edge are adjusted using a blending processing with adaptive weights to obtain the prediction signal for the whole CU. Then, transform and quantization process can be applied to the whole CU as in other prediction modes. Finally, the motion field of a CU predicted using the geometric partition modes is stored.

In the geometric partitioning mode, in some examples, a candidate list that is referred to as geometric uni-prediction candidate list is derived directly from the merge candidate list constructed according to the extended merge prediction process (also referred to as extended merge candidate list). In an example, n denotes an index (merge index) of a uni-prediction motion in the geometric uni-prediction candidate list. The LX motion vector of the n-th candidate in the extended merge candidate list, with X equal to the parity of n, is used as the n-th candidate of the geometric uni-prediction candidate list for geometric partitioning mode.

Figure 19:
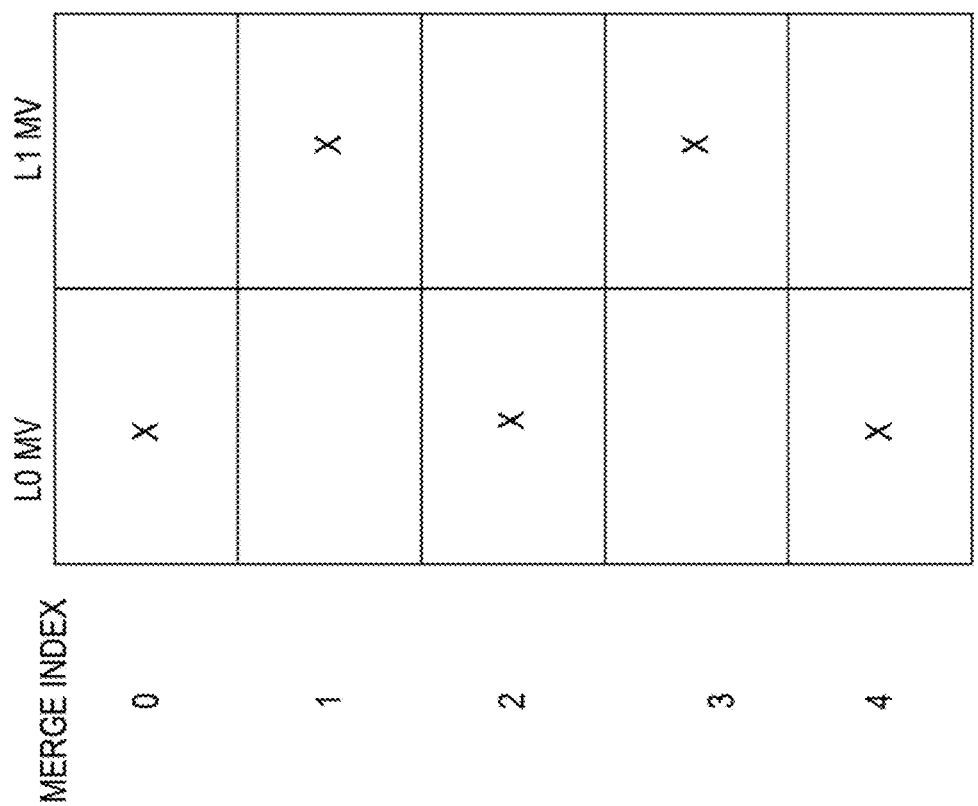
FIG. 19 shows a diagram for uni-prediction motion vector selection for the geometric partition mode in some examples.

FIG. 19 shows a diagram for uni-prediction MV selection for the geometric partition mode in some examples. The motion vectors are marked with "X" in FIG. 19. For example, when the merge index n is 0, the parity is 0, then L0 motion vector of the n-th candidate in the extended merge candidate list is used as the n-th motion vector of the geometric uni-prediction candidate list for the geometric partitioning mode; when the merge index n is 1, the parity is 1, then the L1 motion vector of the n-th candidate in the extended merge candidate list is used as the n-th motion vector in the geometric uni-prediction candidate list for the geometric partitioning mode; when the merge index n is 2, the parity is 0, then the L0 motion vector of the n-th candidate of the extended merge candidate list is used as the n-th motion vector in the geometric uni-prediction candidate list for the geometric partitioning mode; when the merge index n is 3, the parity is 1, then the L1 motion vector of the n-th candidate in the extended merge candidate list is used as the n-th motion vector in the geometric uni-prediction candidate list for the geometric partitioning mode; when the merge index n is 4, the parity is 0, then the L0 motion vector of the n-th candidate of the extended merge candidate list is used as the n-th motion vector in the geometric uni-prediction candidate list for the geometric partitioning mode.

In some examples, when a LX motion vector of the n-th candidate in the extended merge candidate list does not exist, the L(1−X) motion vector of the same candidate is used instead as the uni-prediction motion vector for geometric partitioning mode.

In some examples, after predicting each part of a geometric partition using its own motion, blending is applied to the two prediction signals to derive samples around geometric partition edge. In an example, the blending weight for each position of the CU are derived based on the distance between individual position and the partition edge.

For example, the distance for a position (x, y) to the partition edge are derived as equations (33)-(36):

$$d(x, y) = (2x + 1 - w)\cos(\varphi_i) + (2y + 1 - h)\sin(\varphi_i) - \rho_j \quad \text{Eq. (33)}$$

$$\rho_j = \rho_{x,j}\cos(\varphi_i) + \rho_{y,j}\sin(\varphi_i) \quad \text{Eq. (34)}$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \quad \text{Eq. (35)}$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \quad \text{Eq. (36)}$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following equations (37)-(39):

$$wIdxL(x, y) = partIdx ? 32 + d(x, y) : 32 - d(x, y) \quad \text{Eq. (37)}$$

$$w_0(x, y) = \frac{\text{Clip3}(0, 8, (wIdxL(x, y) + 4) \gg 3)}{8} \quad \text{Eq. (38)}$$

$$w_1(x, y) = 1 - w_0(x, y) \quad \text{Eq. (39)}$$

The partIdx depends on the angle index i.

Figure 20:
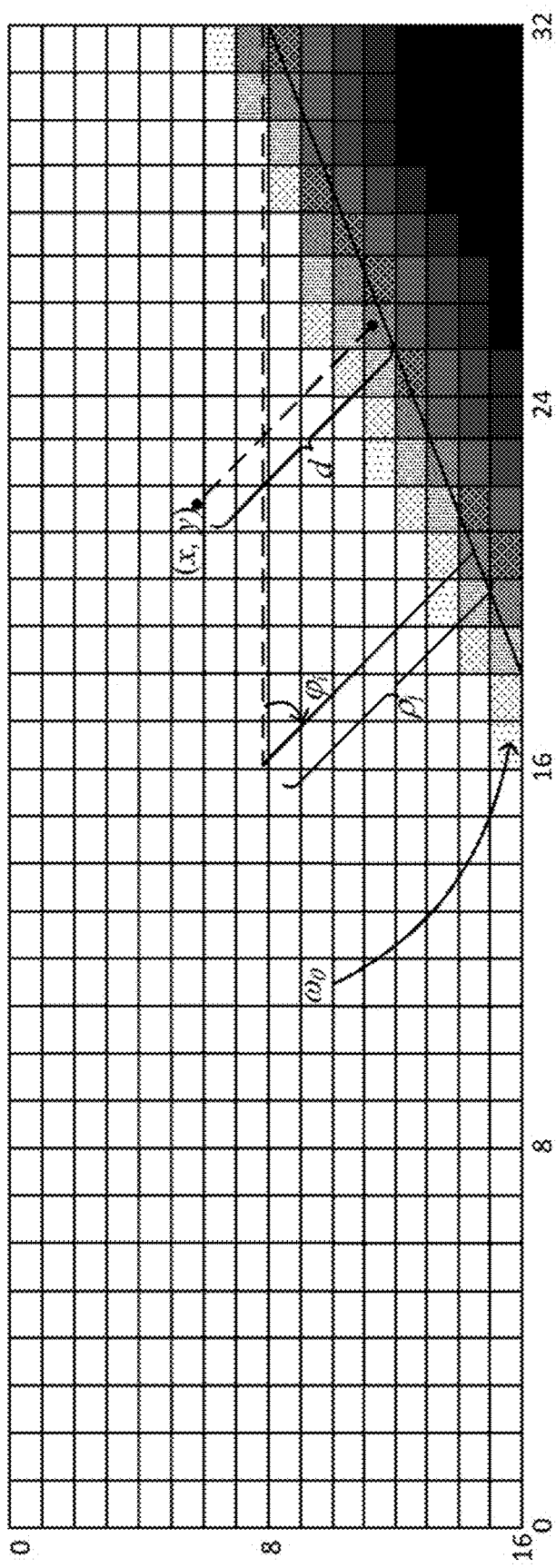
FIG. 20 shows a diagram illustrating generation of a blending weigh in the geometric partitioning mode in some examples.

FIG. 20 shows a diagram illustrating generation of a blending weigh $w_0$ in the geometric partitioning mode in some examples.

The motion field information of the geometric partitioning mode is suitably stored. In some examples, a first motion vector Mv1 from the first part of the geometric partition, a second motion vector Mv2 from the second part of the geometric partition and a combined My of Mv1 and Mv2 are stored in the motion filed of a geometric partitioning mode coded CU.

The stored motion vector type for each individual position in the motion filed are determined according to equation (40):

$$sType = abs(motionIdx) < 32 ? 2(motionIdx \leq 0 ? (1 - partIdx) : partIdx) \quad \text{Eq. (40)}$$

where motionIdx is equal to d(4x+2, 4y+2), which is recalculated from equation (33). The partIdx depends on the angle index i.

When sType is equal to 0, Mv1 is stored in the corresponding motion field; when sType is equal to 1, Mv2 is stored in the corresponding motion field; when sType is equal to 2, a combined My from Mv1 and Mv2 are stored. The combined My are generated using the following process: when Mv1 and Mv2 are from different reference picture lists (one from L0 and the other from L1), then Mv1 and Mv2 are simply combined to form the bi-prediction motion vectors. Otherwise, when Mv1 and Mv2 are from the same list, only uni-prediction motion Mv2 is stored in an example.

Some video coding standards, such as HEVC and AVC/H.264, use a fixed motion vector resolution of quarter luma sample. According to an aspect of the disclosure, an optimum trade-off between displacement vector rate and prediction error rate has to be chosen to achieve overall rate-distortion optimality. Some video coding standards, such as VVC, allow to select the motion vector resolution at coding block level and, therefore, to trade-off bit rate versus fidelity for the signaling of the motion parameters. Specifically, VVC enables adaptive motion vector resolution (AMVR) in the AMVR mode. The AMVR mode is signaled at the coding block level if at least one component of an MVD is not equal to zero. The motion vector predictor is rounded to a given resolution such that the resulting motion vector is guaranteed to fall on a grid of the given resolution. For each given resolution, a number of shifting bits (denoted by AmvrShift) for motion vector difference is defined to specify the resolution of the motion vector difference with the left shifting operation with AmvrShift-bit. The given motion vector differences, denoted as MvdL0 and MvdL1 in AMVP mode and MvdCpL0, and MvdCpL1 in affine AMVP mode, are modified when AMVR mode is enable.

FIG. 21 shows a table to determine the number of shifting bits AmvrShift according to the flags and/or syntaxes.

FIG. 22 shows a portion of VVC standard that modifies motion vector differences in the AMVP mode and the affine AMVP mode when AMVR mode is enabled.

According to an aspect of the disclosure, a motion vector may point to regions outside a boundary of a reference picture. In some examples, constraint is applied on bi-prediction when certain reference samples used in motion compensation are out of picture boundaries.

In an example, when a current pixel with bi-prediction motion vectors has motion vector on one of the two reference lists pointing to a position which is beyond a threshold of distance out of the picture boundary, the motion vector for that reference list is considered out of boundary, and the inter prediction is changed to uni-prediction. In the example, only the motion vector for the other reference list which is not out of boundary will be used for the uni-prediction. In an example, when MVs for both reference lists are out of boundary, bi-prediction is not constrained.

In another example, the constraint on bi-prediction is applied at sub-block level.

Figure 23:
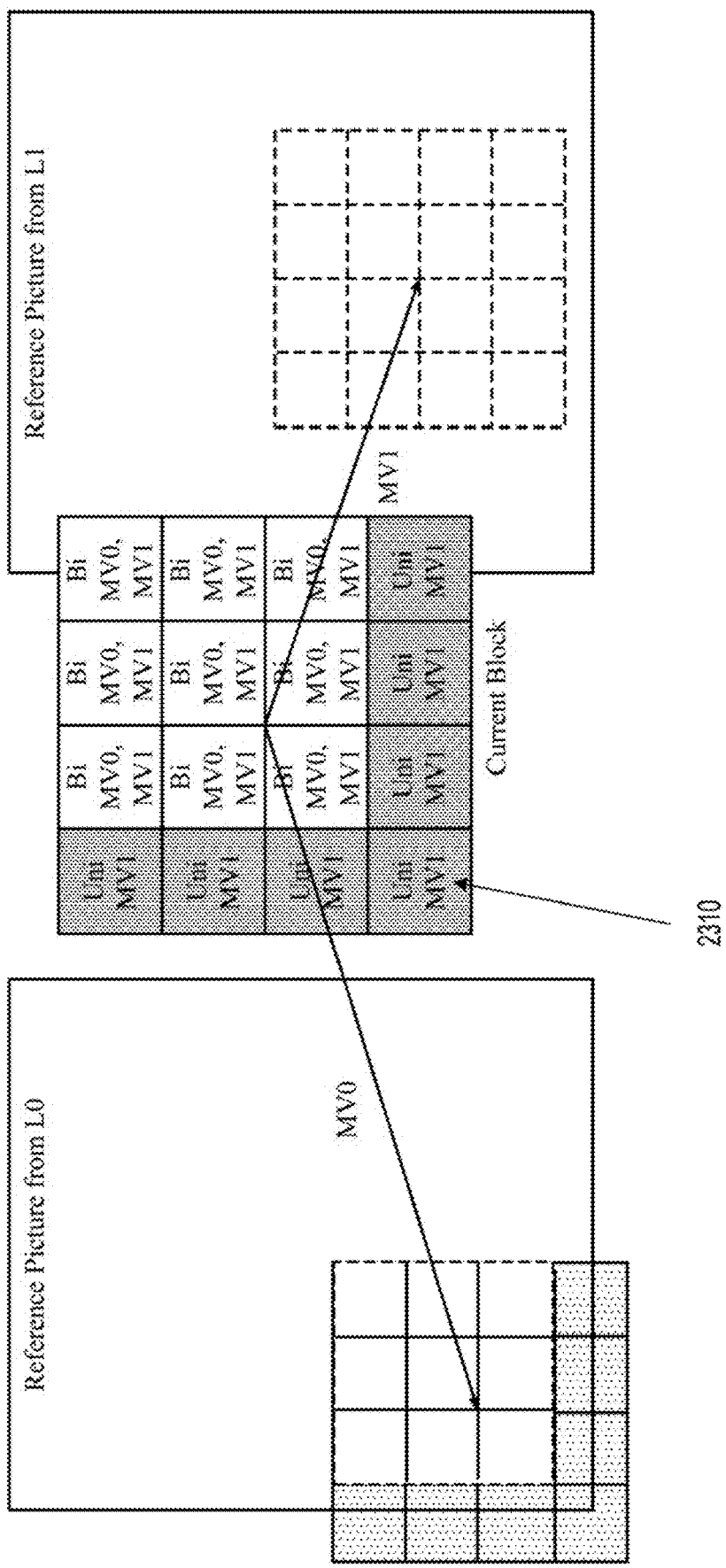
FIG. 23 shows a diagram illustrating sub block level bi-prediction constraint in some examples.

FIG. 23 shows a diagram illustrating sub block level bi-prediction constraint in some examples.

As shown in FIG. 23, for each sub block of the N×N sub-blocks (e.g., 16 sub blocks in the current block) within a coding block (e.g., current block) with inter Bi-prediction MVs, when the motion vectors on one of the reference lists (e.g., reference picture from L0 in FIG. 23) is pointing out of the boundary of the reference picture beyond a threshold of M pixels, the sub-block may be changed to a uni-prediction mode, with only the MV on the reference list which is not pointing beyond the out of boundary threshold on the corresponding reference picture. As shown in FIG. 23, sub blocks 2310 at the edge of the current block are switched to the uni-prediction mode due to the constraint.

In some examples, the bi-prediction related tools maybe disabled or modified when bi-prediction is changed to uni-prediction due to out of boundary conditions. In an example, when the bi-prediction restriction is applied and uni-prediction is used, BDOF may be disabled.

In some examples, techniques for picture boundary padding can be used. The padded portion outside the picture boundary may be used for prediction of other pictures.

For example, in VVC and ECM-4.0, an extended picture area is an area surrounding the picture with a size of (maxCUwidth+16) in each direction of the picture boundary. The pixels in the extended area are derived by repetitive boundary padding. When a reference block locates partially or completely out of the picture boundary (OOB), the repetitive padded pixels in the extended area can be used similarly as pixels in the reference picture for motion compensation.

Figures 24A, 24B:
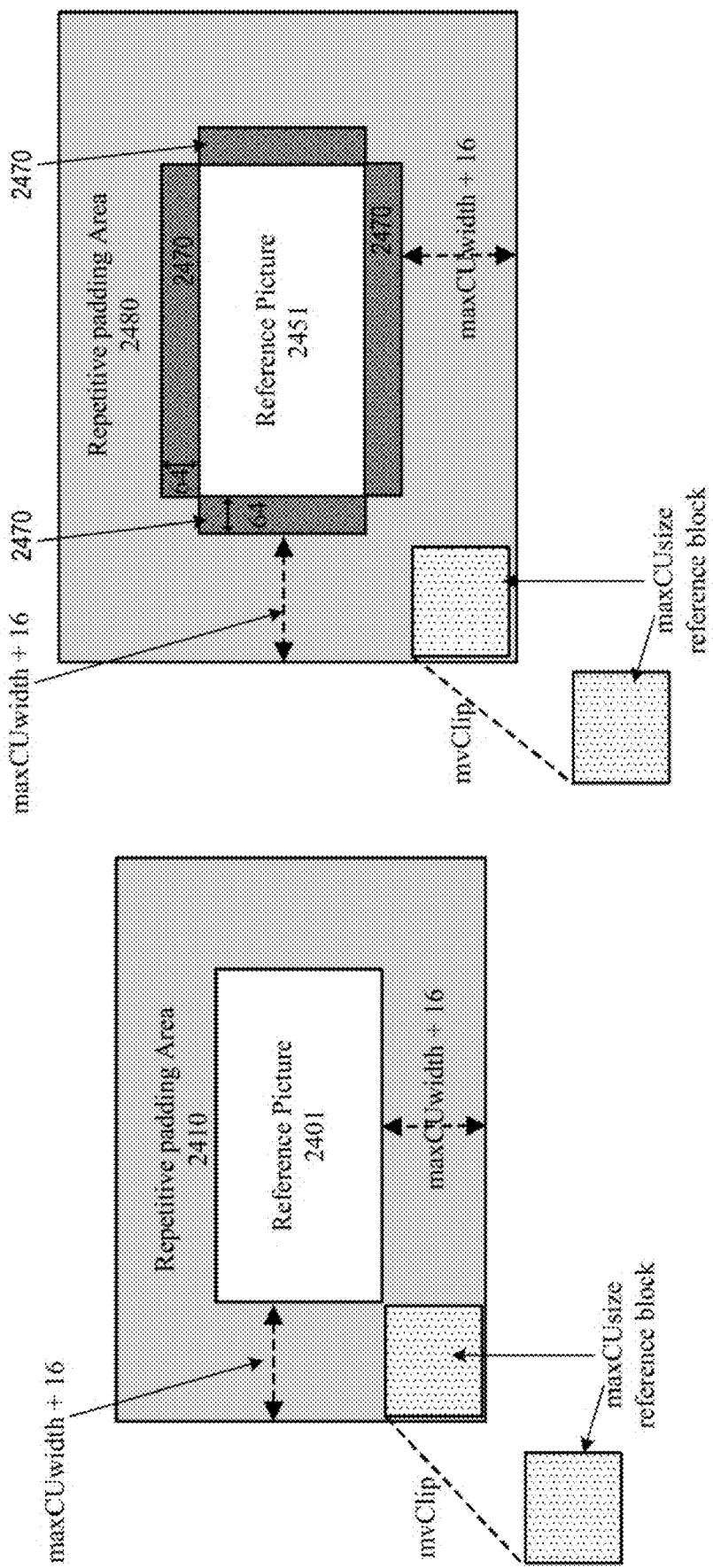
FIGS. 24A-24B show diagrams of extended areas of pictures for padding in some examples.

FIG. 24A shows a diagram of a reference picture (2401) with an extended area (also referred to as repetitive padding area or padded area) (2410) that is padded according to the repetitive boundary padding in some examples (e.g., ECM-4.0). In an example, in a first round of the repetitive boundary padding, first pixels in the extended area that are immediate neighbors of pixels within the reference picture boundary are padded based on the pixels within the reference picture boundary; in a second round of the repetitive boundary padding, second pixels in the extended area that are immediate neighbors of the first pixels are padded based on the first pixels; and the rounds of the repetitive boundary padding can continue until all pixels in the extended area are padded in an example.

In a related example, a technique for motion compensation boundary padding can be used. For example, samples outside of the picture boundary are derived by motion compensation instead of using only repetitive padding.

FIG. 24B shows a diagram illustrating a reference picture with an extended area (also referred to as padded area) that is padded according to motion compensation boundary padding and the repetitive boundary padding in some examples. In the FIG. 24B example, the total padded area size is increased by 64 comparing to the padded area (2410) in FIG. 24A to keep MV clipping. The extended area includes a first portion (2470) that can be padded according to motion compensation boundary padding. The first portion (2470) is also referred to as motion compensation (MC) padding area. The the extended area also includes the repetitive padding area (2480) that is padded by repetitive padding, non-normative.

Figure 25:
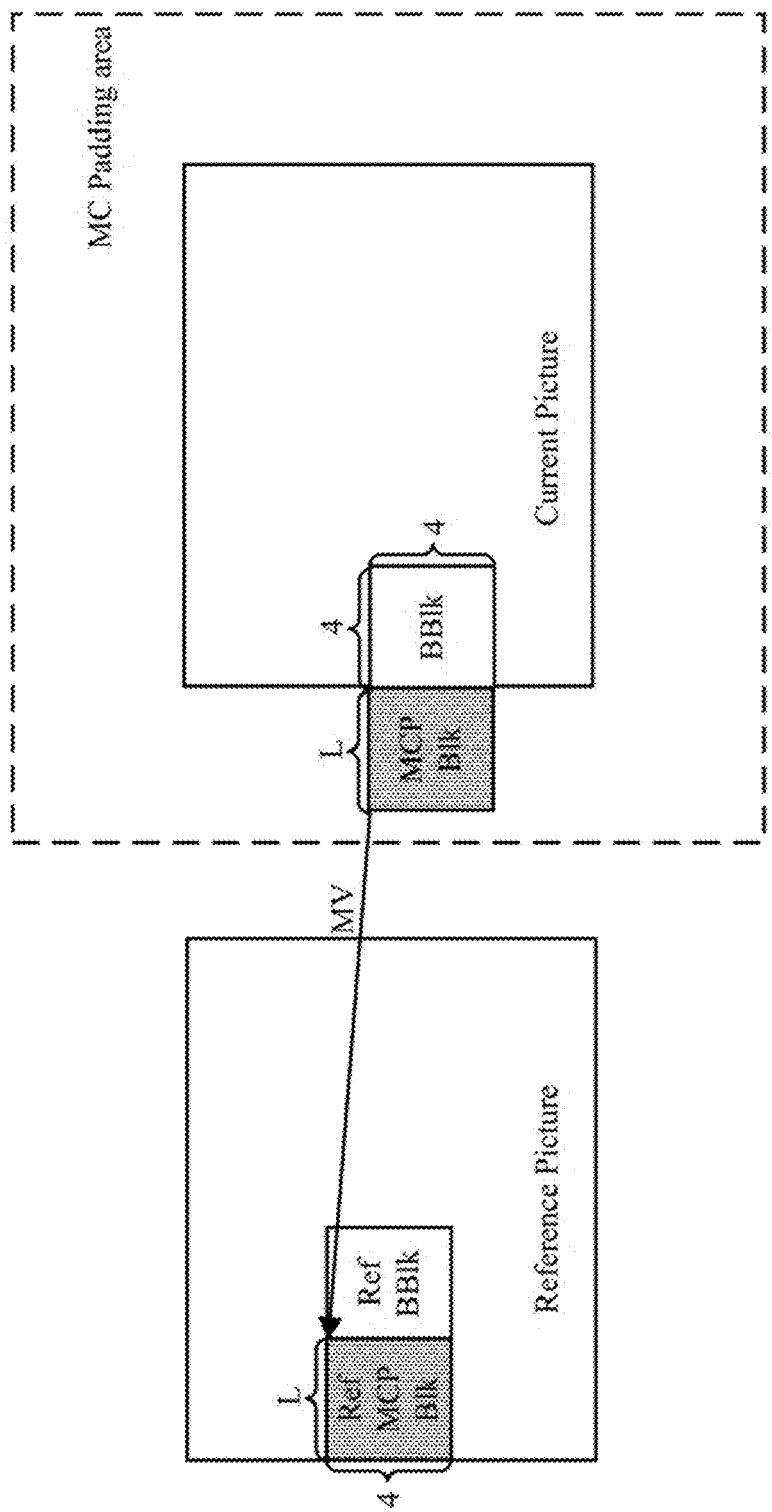
FIG. 25 shows a diagram illustrating motion compensation boundary padding in some examples.

FIG. 25 shows a diagram illustrating motion compensation (MC) boundary padding in some related examples. In MC boundary padding, a MV of a 4×4 boundary block (shown as BBlk) in a current picture is utilized to derive a L×4 or 4×L padding block (shown as MCP Blk) in the MC padding aera of the current picture. The value L is derived as the distance of the reference block (shown as Ref BBlk) for the boundary block to the reference picture boundary as shown on FIG. 25. In an example, when the boundary block is intra coded, then MV is not available, and L is set equal to 0. If L is less than 64, the rest of the MC padding area is filled with the repetitive padded samples by using repetitive padding in an example.

In case of bi-directional inter prediction, only one prediction direction, which has a motion vector pointing to the pixel position farther away from the picture boundary in the reference picture in terms of the padding direction, is used in MC (boundary) padding.

In some examples, the pixels in MC padding block are corrected with an offset, which is equal to the difference between the DC values of the reconstructed boundary block (e.g., BBlk in FIG. 25) and its corresponding reference block (e.g., Ref BBlk in FIG. 25) in the reference picture.

According to an aspect of the disclosure, the motion compensation boundary padding technique in the above related examples may be not efficient enough. For example, in the related examples, only corresponding boundary block's MV is used. There is certain chances that repetitive padding is used instead of motion compensation boundary padding (also referred to as motion compensation padding in some examples).

Some aspects of the disclosure provide additional techniques of deriving the MV for motion compensation boundary padding.

According to some aspects of the disclosure, a simplified skip mode can be used for the motion compensation padding blocks. In the simplified skip mode, a block (also referred to as MC padding block) in the MC padding area is predicted according to a motion vector pointing to a reference block in a reference picture.

According to an aspect of the disclosure, the motion information of the MC padding blocks are derived from one of multiple neighboring candidates at the picture boundary. It is noted that due to the use of multiple neighboring candidates, the chance of no motion information for motion compensation boundary padding is reduced.

Figure 26:
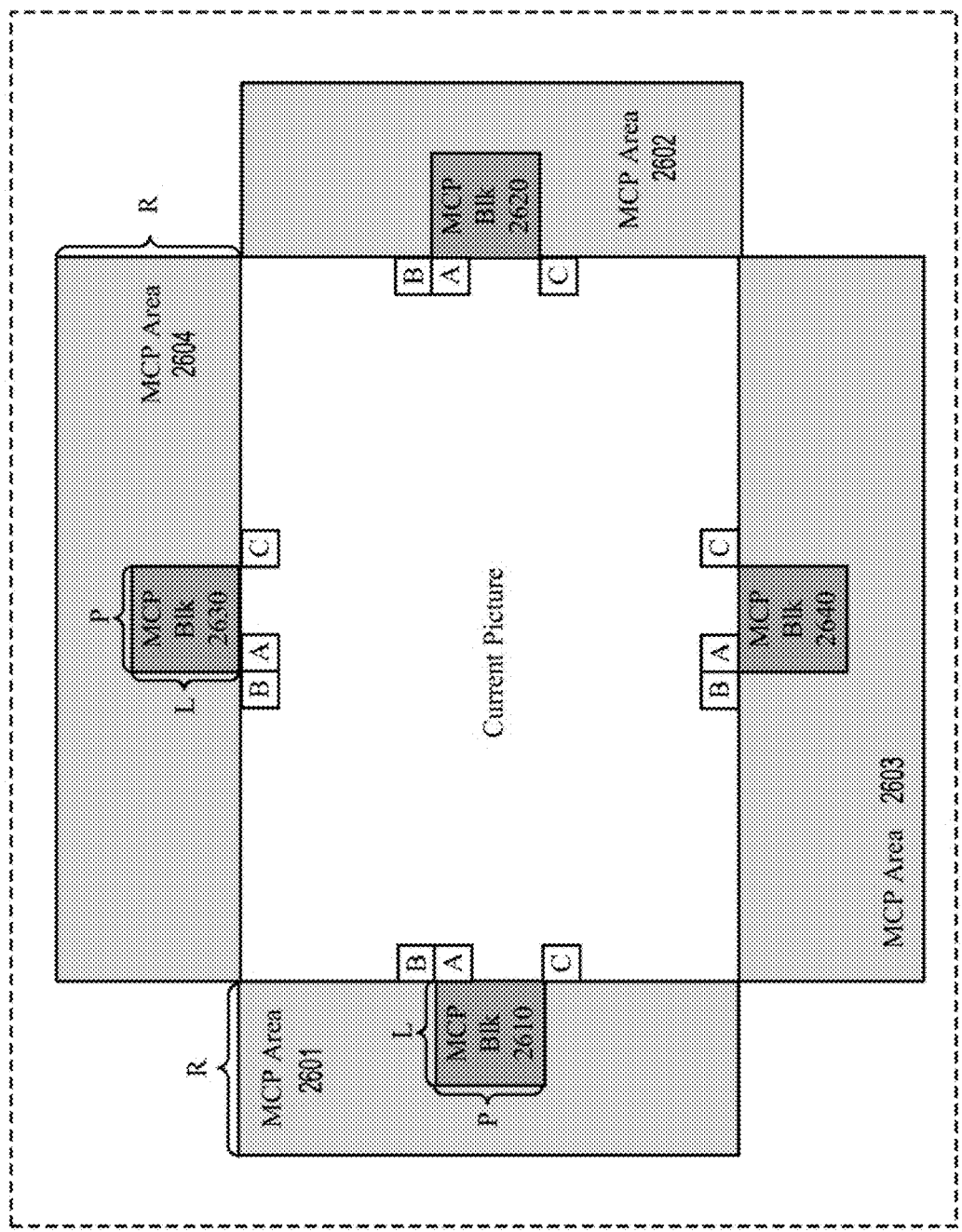
FIG. 26 shows a diagram that illustrates an example of deriving motion information for motion compensation padding blocks in some examples.

FIG. 26 shows a diagram that illustrates an example of deriving motion information for motion compensation padding (MCP) blocks in some examples.

In FIG. 26 example, 3 neighboring candidate positions A, B, and C, may be used to derive the motion information for an MCP block.

In FIG., 26, when an MCP block (2610) is at the left side of the vertical picture boundary, the position A is the right neighboring position, the position B is the above-right neighboring position, the position C is the bottom-right neighboring position. When an MCP block (2620) is at the right side of the vertical picture boundary, the position A is the left neighboring position, position B is the above-left neighboring position and position C is the bottom-left neighboring position.

In FIG. 26, when an MCP block (2630) is at the top of the horizontal picture boundary, the position A is the bottom neighboring position, position B is the bottom-left neighboring position and position C is the bottom-right neighboring position. When an MCP block (2640) is at the bottom side of the horizontal picture boundaries, the position A is the above neighboring position, position B is the above-left neighboring position, and position C is the above-right neighboring position.

In some embodiments, each candidate position corresponding to a block size of N×N. In an example, N is equal to 4. In another example, N is equal to 8.

In some embodiments, the MCP areas are defined by four rectangles extended from the picture boundaries. In the FIG. 26 example, the MCP areas include four rectangles (2601)-(2604). A range parameter R of the rectangles (2601)-(2604) defines luma samples extended from the picture boundary outwards. In an example, R is equal to 64 luma samples. In another example, R is equal to the padding range.

In some embodiments, the MCP block size is P×L for top/bottom boundaries and L×P for left/right boundaries, as shown in FIG. 26. In an example, where L is equal to MCP range R or the distance of the reference block to reference picture boundary (e.g., similar to FIG. 25), whichever is smaller. In some examples, P is a predefined size in luma samples. In an example, P is equal to 4. In another example, P is equal to 8.

In some embodiments, the 3 neighboring positions (e.g., A, B and C in FIG. 26) may be checked in an order, such as A→B→C. The first available candidate in the checking order may be used as the motion information predictor for the MCP block. Then, motion information may be used for prediction of the MCP block to generate the padded samples in the MCP block.

In some embodiments, a neighboring position that is selected for the prediction of a MCP block may be signaled. In some examples, one bin is used as candidate index to signal one of the first 2 available neighboring positions (also referred to as neighboring candidates or neighboring candidate positions). In some examples, variable length coding may be used to signal one of the 3 available neighboring candidates. In some examples, when there's only one candidate block has available motion information, the signaling may not be necessary, and the available candidate may be used implicitly. In some examples, the signaling of all the MCP blocks may be done all at once for the whole frame in a pre-defined order.

In an example, the pre-defined order starts from the left MCP block in the top MCP area, following the clockwise direction for all the MCP blocks till the top MCP block in the left MCP area.

Figure 27:
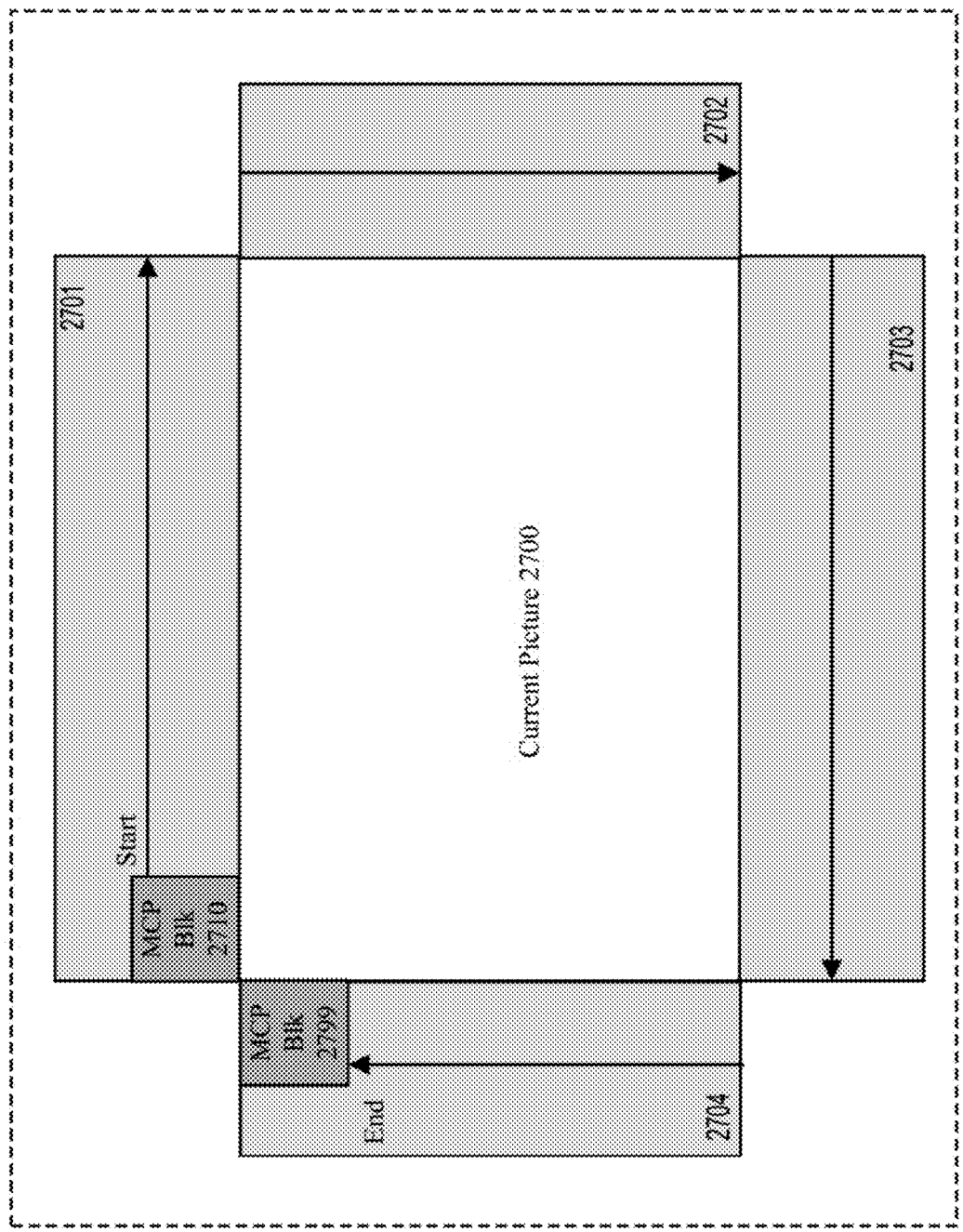
FIG. 27 shows a diagram illustrating an encoding order in some examples.

FIG. 27 shows a picture (2700) with picture boundaries in some examples. MCP area (2701)-(2704) extends from the picture boundaries. FIG. 27 also shows a pre-defined order starts from a left MCP block (2710) in the top MCP area (2701), following the clockwise direction for all the MCP blocks till the top MCP block (2799) in the left MCP area (2704).

In another example, the pre-defined order may be top MCP area (2701) from left to right, bottom MCP area (2703) from left to right, left MCP area (2704) from top to bottom, and right MCP are (2702) from top to bottom.

In some embodiments, the pixels in an MCP block are corrected with an offset. The offset can be determined as a difference between the DC values of the reconstructed candidate block (e.g., a candidate block at one of A, B, C position) and the corresponding reference block of the reconstructed candidate block in the reference picture.

According to another aspect of the disclosure, for MCP blocks next to a picture boundary (e.g., a left boundary, a right boundary, an upper boundary, a bottom boundary) of a picture, the motion information is derived from all the inter minimal blocks (e.g., each 4×4 block as in VVC) at the picture boundary in the picture. For example, the mostly used motion information from the inter minimal blocks at the picture boundary is determined and used for the motion compensation of all the MCP blocks next to the picture boundary.

In some examples, the usage of motion information is collected from all the inter minimal blocks at the corresponding picture boundary. In some examples, the usage of motion information is collected from only the inter minimal blocks with reference index of 0 for L0 and/or Li. In an example, the usage of motion information is collected from only the inter minimal blocks with reference index of 0 for L0. In another example, the usage of motion information is collected from only the inter minimal blocks with reference index of 1 for L1.

According to another aspect of the disclosure, for MCP blocks next to a picture boundary (e.g., a left boundary, a right boundary, an upper boundary, a bottom boundary), the motion information is derived from all the inter minimal blocks at the corresponding picture boundary. For example, the average motion vector is determined and used for the motion compensation of all the MCP blocks next to the picture boundary.

In some examples, the average of motion vector is calculated based on all the inter minimal blocks at the corresponding picture boundary. In some examples, the average of motion vector is calculated based on only the inter minimal blocks with reference index of 0 for L0 and/or L1. In an example, average of motion vector is calculated based on only the inter minimal blocks with reference index of 0 for L0. In another example, average of motion vector is calculated based on only the inter minimal blocks with reference index of 1 for L1.

According to an aspect of the disclosure, when a boundary block is intra coded and no motion info is available for related MCP blocks, repetitive padding may be used for the related MCP blocks.

According to an aspect of the disclosure, the motion information of an MCP block is derived from spatial candidates and temporal candidates, such as one candidate of multiple neighboring candidates at the picture boundary and N temporally co-located blocks (temporal candidates) of the current block (e.g., current MCP block). Example values of N include but not limited to 1, 2, 3, 4, . . .

In some examples, the N temporally co-located blocks refer to N subblocks located at N pre-defined relative positions of a block in one reference picture with the same coordinate of the current block.

Figure 28:
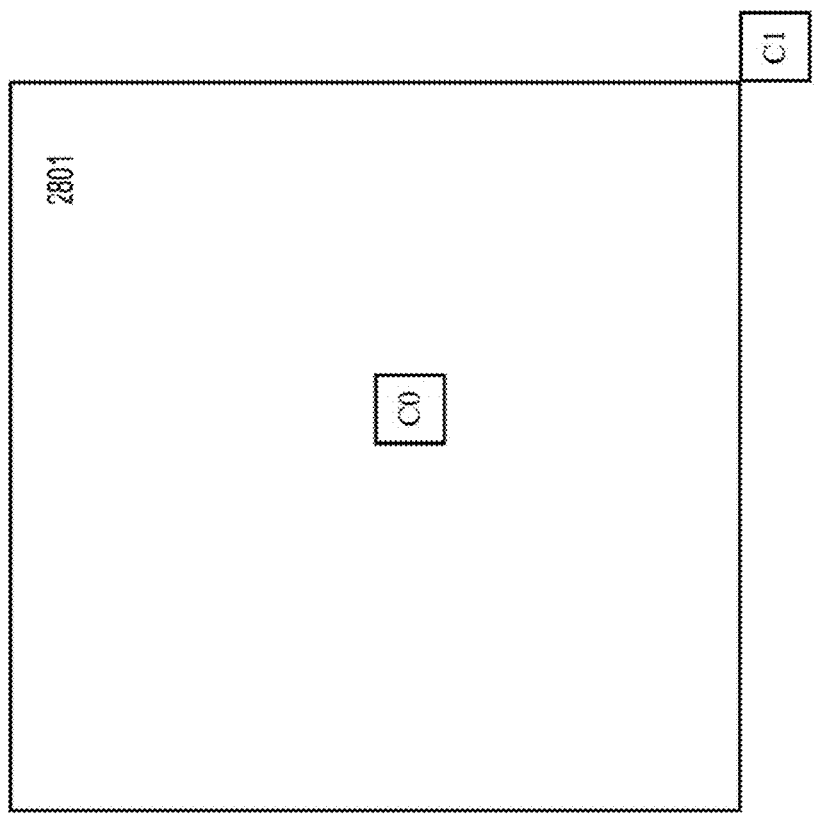
FIG. 28 shows a diagram to illustrate temporally co-located blocks in some examples.

FIG. 28 shows a diagram to illustrate 2 temporally co-located blocks in some examples. In FIG. 28, a block (2801) is in a reference picture and at the same coordinates as a current MCP block in the current picture. The two temporally co-located blocks at pre-defined relative positions are shown as a block C0 at the middle position and a block C1 at bottom right position.

In some examples, both the multiple spatially neighboring blocks (e.g., at the neighboring positions) of an MCP block and N temporally co-located blocks of the MCP block are scanned, and the multiple spatially neighboring blocks are checked before the temporally co-located blocks, the first available candidate may be used as the motion information predictor for the MCP block.

According to some aspects of the disclosure, for samples located at the picture boundary in the padding area of the picture, further adjustment on the sample values can be performed. In some examples, the adjustment on the sample values is based on a deblocking process on the padded samples located at the picture boundary. In some examples, the adjustment on the sample values is based on a smoothing filtering process on the padded samples located at the picture boundary.

Figure 29:
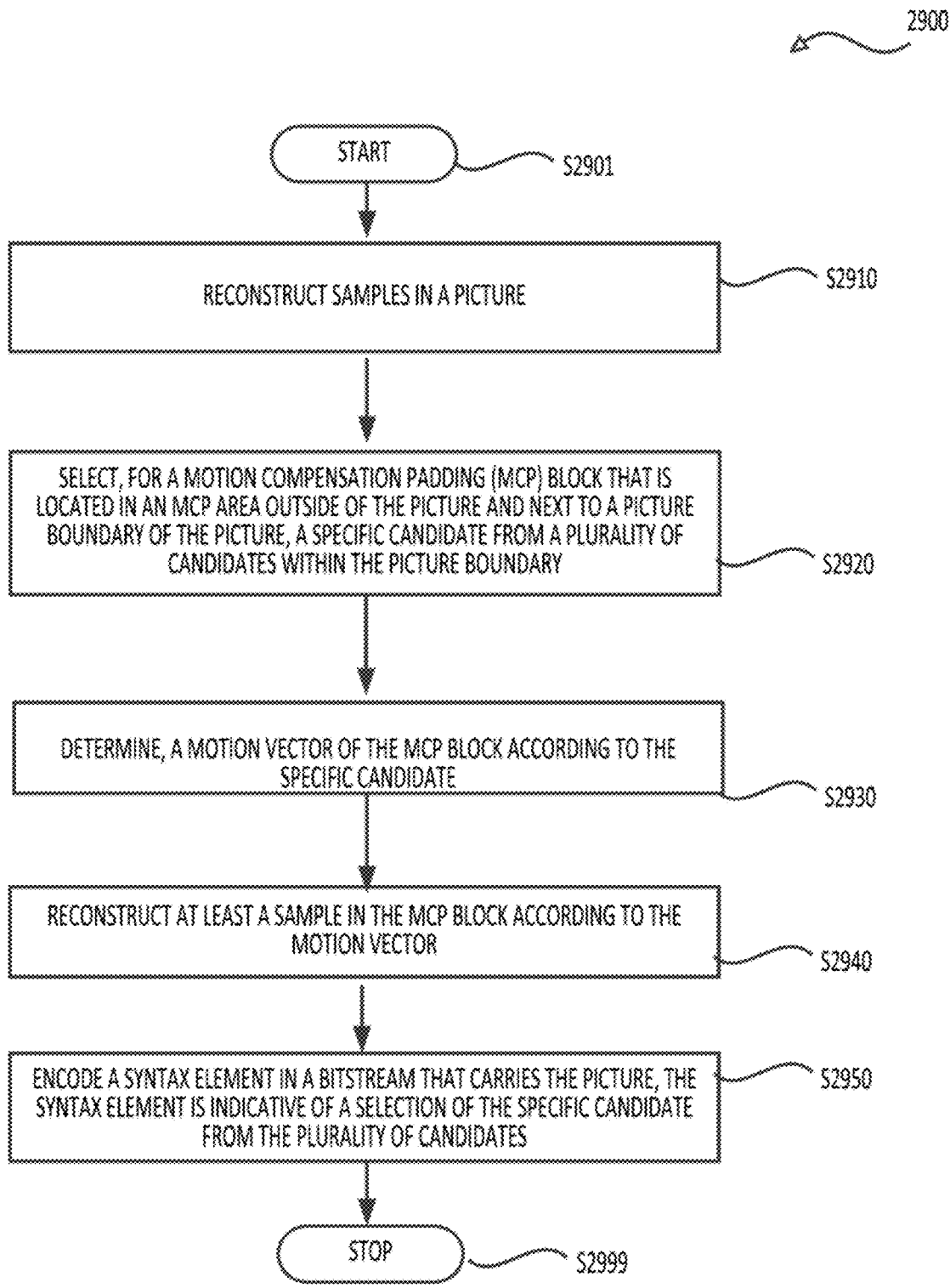
FIG. 29 shows a flow chart outlining a process according to some embodiment of the disclosure.

FIG. 29 shows a flow chart outlining a process (2900) according to an embodiment of the disclosure. The process (2900) can be used in a video encoder. In various embodiments, the process (2900) is executed by processing circuitry, such as the processing circuitry that performs functions of the video encoder (103), the processing circuitry that performs functions of the video encoder (303), and the like. In some embodiments, the process (2900) is implemented in software instructions, thus when the processing circuitry executes the software instructions, the processing circuitry performs the process (2900). The process starts at (S2901) and proceeds to (S2910).

At (S2910), samples in a picture are reconstructed.

At (S2920), for a motion compensation padding (MCP) block that is located in an MCP area outside of the picture and next to a picture boundary of the picture, a specific candidate is selected from a plurality of candidates at the picture boundary within the picture.

At (S2930), a motion vector of the MCP block is determined according to motion information of the specific candidate.

At (S2940), at least a sample in the MCP block is reconstructed according to the motion vector.

At (S2950), a syntax element is encoded in a bitstream that carries the picture, the syntax element is indicative of a selection of the specific candidate from the plurality of candidates.

In some examples, a bin is included in the bitstream, and the bin indicates one of first two available candidates in the plurality of candidates.

In some examples, the syntax element that indicates the specific candidate from three available candidates is encoded by variable length coding.

In some examples, it is determined that only one candidate in the plurality of candidates has available motion information. Then, no need to encode the syntax element in the bitstream is determined in response to the only one candidate.

In some examples, a sequence of bits are encoded in the bitstream, the sequence of bits indicate respective candidates for MCP blocks that are located outside picture boundaries of the picture according to a pre-defined order of the MCP blocks.

Then, the process proceeds to (S2999) and terminates.

The process (2900) can be suitably adapted. Step(s) in the process (2900) can be modified and/or omitted. Additional step(s) can be added. Any suitable order of implementation can be used.

Figure 30:
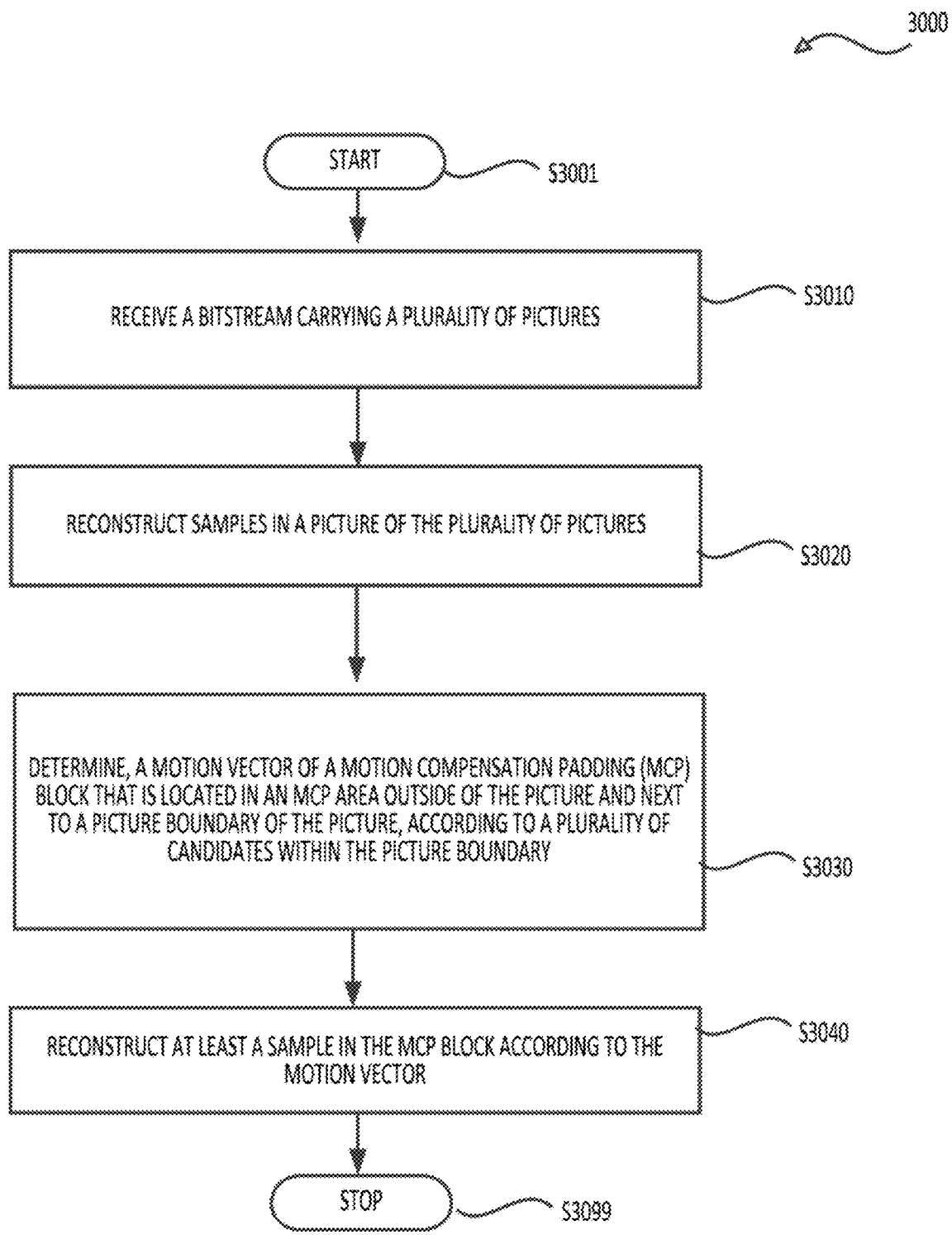
FIG. 30 shows a flow chart outlining another process according to some embodiment of the disclosure.

FIG. 30 shows a flow chart outlining a process (3000) according to an embodiment of the disclosure. The process (3000) can be used in a video decoder. In various embodiments, the process (3000) is executed by processing circuitry, such as the processing circuitry that performs functions of the video decoder (110), the processing circuitry that performs functions of the video decoder (210), and the like. In some embodiments, the process (3000) is implemented in software instructions, thus when the processing circuitry executes the software instructions, the processing circuitry performs the process (3000). The process starts at (S3001) and proceeds to (S3010).

At (S3010), a bitstream carrying a plurality of pictures is received.

At (S3020), samples in a picture of the plurality of pictures are reconstructed.

At (S3030), a motion vector for a motion compensation padding (MCP) block that is located in an MCP area outside of the picture and next to a picture boundary of the picture, is determined according to a plurality of candidates at the picture boundary within the picture.

At (S3040), at least a sample in the MCP block is reconstructed according to the motion vector.

In some examples, a candidate in the plurality of candidates corresponds to a neighboring block for the MCP block, the neighboring block has a predetermined block size.

In some examples, the MCP area corresponds to a rectangle that is extended from the picture boundary outwards by a MCP range for padding according to motion compensation.

To determine the motion vector of the MCP block, in some examples, the plurality of candidates is checked according to a predetermined order to determine a first available candidate having motion information. The motion vector of the MCP block is determined according to the motion information of the first available candidate.

To determine the motion vector of the MCP block, in some examples, a signal indicative of a specific candidate in the plurality of candidates is decoded from the bitstream. Then, the motion vector of the MCP block is determined according to motion information of the specific candidate. In an examples, a sequence of bits is decoded from the bitstream. The sequence of bits indicate respective candidates for MCP blocks that are located outside picture boundaries of the picture according to a pre-defined order for the MCP blocks.

To reconstruct the at least the sample in the MCP block according to the motion vector, in some examples, a first reference block in a reference picture that corresponds to the MCP block is determined according to the motion vector, and the MCP block is reconstructed according to the first reference block. In some examples, an offset is determined based on first DC values of a candidate block that is used to determine the motion vector and second DC values of a second reference block in the reference picture that corresponds to the candidate block. Then, the offset is applied on at least a sample in the MCP block.

In some examples, to determine the motion vector of the MCP block, most used motion information in a set of inter minimal blocks at the picture boundary is determined, and the motion vector is determined according to the most used motion information.

In some examples, to determine the motion vector of the MCP block, an average motion vector from motion information of a set of inter minimal blocks at the picture boundary is determined, and the motion vector is determined according to the average motion vector.

In some examples, the motion vector of the MCP block is determined according to the plurality of candidates within the picture boundary, and one or more co-located blocks for the MCP block in a reference picture. For example, the plurality of candidates are checked before the one or more co-located blocks for the MCP block in the reference picture to determine first available motion information. Then, the motion vector of the MCP block is determined according to the first available motion information.

In some examples, at least one of a deblocking filter and a smoothing filter on is applied on the at least the sample in the MCP block.

Then, the process proceeds to (S3099) and terminates.

The process (3000) can be suitably adapted. Step(s) in the process (3000) can be modified and/or omitted. Additional step(s) can be added. Any suitable order of implementation can be used.

The techniques described above, can be implemented as computer software using computer-readable instructions and physically stored in one or more computer-readable media. For example, FIG. 31 shows a computer system (3100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 31:
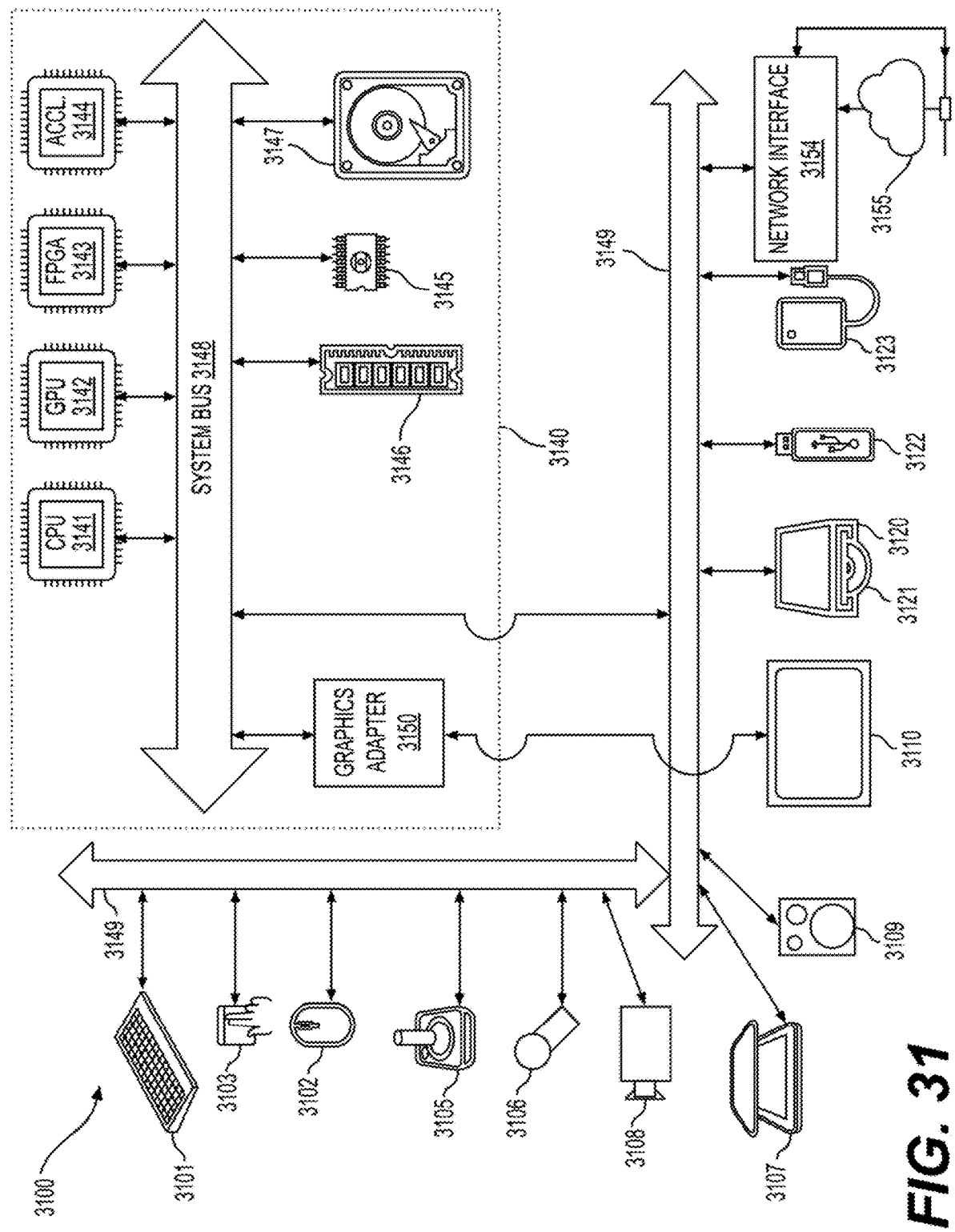
FIG. 31 is a schematic illustration of a computer system in accordance with an embodiment.

The components shown in FIG. 31 for computer system (3100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3100).

Computer system (3100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3101), mouse (3102), trackpad (3103), touch screen (3110), data-glove (not shown), joystick (3105), microphone (3106), scanner (3107), camera (3108).

Computer system (3100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3110), data-glove (not shown), or joystick (3105), but there can also be tactile feedback devices that do not serve as input devices), audio output devices (such as: speakers (3109), headphones (not depicted)), visual output devices (such as screens (3110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (3100) can also include human accessible storage devices and their associated media such as optical media including CD/DVD ROM/RW (3120) with CD/DVD or the like media (3121), thumb-drive (3122), removable hard drive or solid state drive (3123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3100) can also include an interface (3154) to one or more communication networks (3155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (3149) (such as, for example USB ports of the computer system (3100)); others are commonly integrated into the core of the computer system (3100) by attachment to a system bus as described below (for example Ethernet interface into a PC computer system or cellular network interface into a smartphone computer system). Using any of these networks, computer system (3100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3140) of the computer system (3100).

The core (3140) can include one or more Central Processing Units (CPU) (3141), Graphics Processing Units (GPU) (3142), specialized programmable processing units in the form of Field Programmable Gate Areas (FPGA) (3143), hardware accelerators for certain tasks (3144), graphics adapters (3150), and so forth. These devices, along with Read-only memory (ROM) (3145), Random-access memory (3146), internal mass storage such as internal non-user accessible hard drives, SSDs, and the like (3147), may be connected through a system bus (3148). In some computer systems, the system bus (3148) can be accessible in the form of one or more physical plugs to enable extensions by additional CPUs, GPU, and the like. The peripheral devices can be attached either directly to the core's system bus (3148), or through a peripheral bus (3149). In an example, the screen (3110) can be connected to the graphics adapter (3150). Architectures for a peripheral bus include PCI, USB, and the like.

CPUs (3141), GPUs (3142), FPGAs (3143), and accelerators (3144) can execute certain instructions that, in combination, can make up the aforementioned computer code. That computer code can be stored in ROM (3145) or RAM (3146). Transitional data can be also be stored in RAM (3146), whereas permanent data can be stored for example, in the internal mass storage (3147). Fast storage and retrieve to any of the memory devices can be enabled through the use of cache memory, that can be closely associated with one or more CPU (3141), GPU (3142), mass storage (3147), ROM (3145), RAM (3146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3100), and specifically the core (3140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3140) that are of non-transitory nature, such as core-internal mass storage (3147) or ROM (3145). The software implementing various embodiments of the present disclosure can be stored in such devices and executed by core (3140). A computer-readable medium can include one or more memory devices or chips, according to particular needs. The software can cause the core (3140) and specifically the processors therein (including CPU, GPU, FPGA, and the like) to execute particular processes or particular parts of particular processes described herein, including defining data structures stored in RAM (3146) and modifying such data structures according to the processes defined by the software. In addition or as an alternative, the computer system can provide functionality as a result of logic hardwired or otherwise embodied in a circuit (for example: accelerator (3144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a video coder, comprising:
   receiving a bitstream carrying a plurality of pictures;
   determining at least a motion compensation padding (MCP) block that is located in an MCP area outside of a picture and next to a picture boundary of the picture;
   determining, according to a plurality of candidates with positions located at the picture boundary within the picture, a motion vector of the MCP block for motion compensated boundary padding, the plurality of candidates including at least a first candidate at a first position at the picture boundary within the picture, a second candidate at a second position at the picture boundary within the picture, and a third candidate at a third position at the picture boundary within the picture, the first candidate being adjacent to a first corner of the MCP block, the second candidate being adjacent to a second corner of the MCP block, and the third candidate being adjacent to (i) the second corner of the MCP block and (ii) the second candidate; and
   reconstructing at least a sample in the MCP block according to the motion vector for the motion compensated boundary padding.

2. The method of claim 1, wherein a candidate in the plurality of candidates corresponds to a neighboring block for the MCP block, the neighboring block has a predetermined block size.

3. The method of claim 1, wherein the MCP area corresponds to a rectangle that is extended from the picture boundary outwards by a MCP range for padding according to motion compensation.

4. The method of claim 1, wherein the determining the motion vector of the MCP block further comprises:
   checking a first available candidate having motion information from the plurality of candidates according to a predetermined order; and determining the motion vector of the MCP block according to the motion information of the first available candidate.

5. The method of claim 1, wherein the determining the motion vector of the MCP block further comprises:
decoding, from the bitstream, a signal indicative of a specific candidate in the plurality of candidates; and
determining the motion vector of the MCP block according to motion information of the specific candidate.

6. The method of claim 5, wherein the decoding the signal indicative of the specific candidate further comprises:
decoding, from the bitstream, a sequence of bits that indicate respective candidates for MCP blocks that are located outside picture boundaries of the picture according to a pre-defined order for the MCP blocks.

7. The method of claim 1, wherein the reconstructing the at least the sample in the MCP block according to the motion vector further comprises:
determining a first reference block in a reference picture for the MCP block according to the motion vector; and
reconstructing the MCP block according to the first reference block.

8. The method of claim 7, wherein the reconstructing the MCP block further comprises:
determining an offset based on first DC values of a candidate block that is used to determine the motion vector and second DC values of a second reference block in the reference picture for the candidate block; and
applying the offset on at least a sample in the MCP block.

9. The method of claim 1, wherein the determining the motion vector of the MCP block further comprises:
determining most used motion information in a set of inter minimal blocks at the picture boundary; and
determining the motion vector according to the most used motion information.

10. The method of claim 1, wherein the determining the motion vector of the MCP block further comprises:
determining an average motion vector from motion information of a set of inter minimal blocks at the picture boundary; and
determining the motion vector according to the average motion vector.

11. The method of claim 1, wherein the determining the motion vector of the MCP block further comprises:
determining the motion vector of the MCP block according to the plurality of candidates within the picture boundary, and one or more co-located blocks for the MCP block in a reference picture.

12. The method of claim 11, wherein the determining the motion vector of the MCP block further comprises:
checking the plurality of candidates before checking the one or more co-located blocks for the MCP block in the reference picture to determine first available motion information; and
determining the motion vector of the MCP block according to the first available motion information.

13. The method of claim 1, wherein the reconstructing the at least the sample in the MCP block according to the motion vector further comprises:
applying at least one of a deblocking filter and a smoothing filter on the at least the sample in the MCP block.

14. A method of video encoding in a video coder, comprising:
determining at least a motion compensation padding (MCP) block that is located in an MCP area outside of a picture in a plurality of pictures and next to a picture boundary of the picture;
determining, according to a plurality of candidates with positions located at the picture boundary within the picture, a motion vector of the MCP block for motion compensated boundary padding, the plurality of candidates including at least a first candidate at a first position at the picture boundary within the picture, a second candidate at a second position at the picture boundary within the picture, and a third candidate at a third position at the picture boundary within the picture, the first candidate being adjacent to a first corner of the MCP block, the second candidate being adjacent to a second corner of the MCP block, and the third candidate being adjacent to (i) the second corner of the MCP block and (ii) the second candidate;
reconstructing at least a sample in the MCP block according to the motion vector for the motion compensated boundary padding; and
encoding the plurality of pictures into a bitstream at least partially based on the MCP block.

15. The method of claim 14, wherein a candidate in the plurality of candidates corresponds to a neighboring block for the MCP block, the neighboring block has a predetermined block size.

16. The method of claim 14, wherein the MCP area corresponds to a rectangle that is extended from the picture boundary outwards by a MCP range for padding according to motion compensation.

17. The method of claim 14, wherein the determining the motion vector of the MCP block further comprises:
checking a first available candidate having motion information from the plurality of candidates according to a predetermined order; and
determining the motion vector of the MCP block according to the motion information of the first available candidate.

18. The method of claim 14, further comprising:
encoding, into the bitstream, a signal indicative of a specific candidate in the plurality of candidates, the specific candidate providing the motion vector of the MCP block.

19. The method of claim 18, wherein the encoding the signal indicative of the specific candidate further comprises:
encoding, into the bitstream, a sequence of bits that indicate respective candidates for MCP blocks that are located outside picture boundaries of the picture according to a pre-defined order for the MCP blocks.

20. A method of processing visual media data, the method comprising:
processing a bitstream that includes the visual media data according to a format rule, wherein
the bitstream carries a plurality of pictures; and
the format rule specifies that:
at least a motion compensation padding (MCP) block that is located in an MCP area outside of a picture and next to a picture boundary of the picture is determined;
a motion vector of the MCP block for motion compensated boundary padding is determined according to a plurality of candidates with positions located at the picture boundary within the picture, the plurality of candidates including at least a first candidate at a first position at the picture boundary within the picture, a second candidate at a second position at the picture boundary within the picture, and a third candidate at a third position at the picture boundary within the picture, the first candidate being adjacent to a first corner of the MCP block, the second candidate being adjacent to a second corner of the MCP block, and the third candidate being adjacent to (i) the second corner of the MCP block and (ii) the second candidate; and at least a sample in the MCP block is processed according to the motion vector for the motion compensated boundary padding.

* * * * *